United States Patent [19]
Burns et al.

[11] Patent Number: 6,047,222
[45] Date of Patent: Apr. 4, 2000

[54] PROCESS CONTROL NETWORK WITH REDUNDANT FIELD DEVICES AND BUSES

[75] Inventors: Harry A. Burns; Brent H. Larson; Larry K. Brown, all of Marshalltown, Iowa

[73] Assignee: Fisher Controls International, Inc., Clayton, Mo.

[21] Appl. No.: 08/983,019

[22] PCT Filed: Oct. 3, 1997

[86] PCT No.: PCT/US97/17983

§ 371 Date: Dec. 30, 1997

§ 102(e) Date: Dec. 30, 1997

[87] PCT Pub. No.: WO96/12993

PCT Pub. Date: May 2, 1996

Related U.S. Application Data

[63] Continuation-in-part of application No. 08/726,266, Oct. 4, 1996, abandoned.

[51] Int. Cl.[7] .................................................. G05B 9/02
[52] U.S. Cl. .................................... 700/79; 700/2; 700/3; 700/82; 700/83; 709/201; 709/210; 709/211; 714/2; 714/6; 714/11
[58] Field of Search ..................................... 370/216–218, 370/222–225; 700/1, 2, 3, 4, 79, 80, 81, 82, 83; 709/200, 201, 208, 209, 210, 211; 714/2, 6, 11

[56] References Cited

U.S. PATENT DOCUMENTS

| | | | |
|---|---|---|---|
| 4,271,505 | 6/1981 | Menot et al. | 370/85 |
| 4,627,045 | 12/1986 | Olson et al. | 370/16 |

(List continued on next page.)

FOREIGN PATENT DOCUMENTS

| | | |
|---|---|---|
| 0 450 116 A1 | 4/1990 | European Pat. Off. . |

(List continued on next page.)

OTHER PUBLICATIONS

Fieldbus Foundation Manual, Communications Technical Specification and User Layer Technical Specification, 1994–1997, including Fieldbus Message Specification FF–870–1.1; Physical Layer Conformance Testing FF–830 FS 1.0; Device Description Language FF–900–1.0; Function Blocks (Part 1) FF–890–1.2; Fieldbus Access Sublayer FF–875–1.1; Function Blocks (Part 2) FF–891–1.2; Data Link Protocol FF–822–1.1; System Management FF–880–1.1; Communication Profile FF–940–1.0; Transducer Blocks (Part 1) FF–902 Rev PS 2.0; Transducer Blocks (Part 2) FF–903–Rev PS 2.0; Data Link Services FF–821–1.0; 31.25 kbit/s Physical Layer Profile FF–816–1.0; Network Management FF–801–1.1; and System Architecture FF–800–1.0.

(List continued on next page.)

*Primary Examiner*—Paul P. Gordon
*Assistant Examiner*—Ramesh Patel
*Attorney, Agent, or Firm*—Marshall, O'Toole, Gerstein, Murray & Borun

[57] ABSTRACT

Functional elements within a two-wire, loop-powered, two-way digital communications environment are interconnected using selective redundant connections and selective redundant functional elements. The redundant functional elements and redundant connections provide a smooth transition from operation of a primary process loop element to a secondary process loop element in the event of a failure of the primary process loop element. Redundancy is selectively implemented using a redundant pair of field devices or a redundant bus pair having a primary bus and a redundant bus. In a first case, redundancy is selectively implemented using a single set of communication media, such as a single communication loop, but implementing redundant functional elements, such as field devices, so that recovery is achieved upon failure of a functional element but not upon failure of the communication media. In a second case, redundancy is selectively implemented using a redundant set of communication media in addition to use of redundant devices so that recovery is attained both for a failing device and a failing communication media. In a third case, redundancy is selectively implemented using a redundant set of communication media but using a single device so that recovery is attained for a failing communication media but not for a failing device.

27 Claims, 10 Drawing Sheets

U.S. PATENT DOCUMENTS

| | | |
|---|---|---|
| 4,691,328 | 9/1987 | Sterling, Jr. et al. ............... 375/36 |
| 4,831,558 | 5/1989 | Shoup et al. ............... 364/550 |
| 4,918,690 | 4/1990 | Markkula, Jr. et al. ............... 370/94 |
| 4,955,305 | 9/1990 | Garnier et al. ............... 112/121.11 |
| 4,974,625 | 12/1990 | Paullus et al. ............... 137/85 |
| 4,976,144 | 12/1990 | Fitzgerald ............... 73/168 |
| 5,014,185 | 5/1991 | Saito et al. ............... 364/188 |
| 5,023,869 | 6/1991 | Grover et al. ............... 370/84 |
| 5,032,525 | 7/1991 | Lee et al. ............... 436/55 |
| 5,109,692 | 5/1992 | Fitzgerald ............... 73/168 |
| 5,132,904 | 7/1992 | Lamp ............... 364/422 |
| 5,148,433 | 9/1992 | Johnson et al. ............... 371/11.3 |
| 5,193,189 | 3/1993 | Flood et al. ............... 395/650 |
| 5,197,328 | 3/1993 | Fitzgerald ............... 73/168 |
| 5,404,524 | 4/1995 | Celi, Jr. ............... 395/700 |
| 5,434,774 | 7/1995 | Seberger et al. ............... 364/172 |
| 5,439,021 | 8/1995 | Burlage et al. ............... 137/84 |
| 5,451,923 | 9/1995 | Seberger et al. ............... 340/310.06 |
| 5,469,150 | 11/1995 | Sitte ............... 340/825.07 |
| 5,469,548 | 11/1995 | Callison et al. ............... 395/441 |
| 5,485,455 | 1/1996 | Dobbins et al. ............... 370/60 |
| 5,530,643 | 6/1996 | Hodorowski ............... 364/191 |
| 5,558,115 | 9/1996 | Lenz et al. ............... 137/86 |
| 5,573,032 | 11/1996 | Lenz et al. ............... 137/486 |
| 5,592,622 | 1/1997 | Isfeld et al. ............... 395/200.02 |
| 5,631,825 | 5/1997 | van Weele et al. ............... 364/188 |
| 5,650,777 | 7/1997 | Westfield et al. ............... 340/870.11 |
| 5,672,975 | 9/1997 | Kielb et al. ............... 324/644 |
| 5,684,451 | 11/1997 | Seberger et al. ............... 340/310.06 |
| 5,778,151 | 7/1998 | Gramckow et al. ............... 395/22 |

FOREIGN PATENT DOCUMENTS

| | | |
|---|---|---|
| 0 449 458 A1 | 10/1991 | European Pat. Off. . |
| 0 546 339 A1 | 6/1993 | European Pat. Off. . |
| 0 562 333 A2 | 9/1993 | European Pat. Off. . |
| 0 575 150 A2 | 12/1993 | European Pat. Off. . |
| 0 604 091 A2 | 6/1994 | European Pat. Off. . |
| 195 10 466 A1 | 10/1996 | Germany . |
| WO 92/04676 | 3/1992 | WIPO . |
| WO 94/22776 | 10/1994 | WIPO . |
| WO 96/12993 | 5/1996 | WIPO . |

OTHER PUBLICATIONS

"Fieldvue® ValveLink™ Series VL2000 Software," Fisher–Rosemount Bulletin 62.1: VL2000, pp. 1–6 (Nov. 1995).

"Fieldvue® VL2000 Series Software User Guide," Fisher Controls, Version 2.0 (Jun. 1996).

"Fieldvue® Digital Valve Controller Type DVC5000 Series," Fisher–Rosemount Bulletin 62.1:DVC5000, pp. 1–12 (Jun. 1994).

"Fieldvue™, Digital Valve Controller DVC5000 Series Remotely Accessible Information," Fisher Controls Bulletin 62.1:DVC5000(S1), pp. 1–2 (Jun. 1994).

"Fieldvue™ Digital Valve Controller Type DVC5000 Series," Fisher Controls Form 5335, pp. 1–35 and Errata Sheet (Jun. 1994).

Fisher–Rosemount Systems, "Fieldbus Technical Overview Understanding Foundation™ Fieldbus Technology," 27 pages, 1997.

"Foundation™ Specification, Function Block Application Process," Part 3, 155 pages, 1995–1996.

Fieldbus Foundation™, "Technical Overview," FD–043 Revision 1.0, 29 pages, 1996.

"Foundation™ Specification, Function Block Application Process," Part 3, 155 pages, 1995–1996.

Fieldbus Foundation™, "Technical Overview," FD–043 Revision 1.0, 29 pages, 1996.

Fromberger, "Feldbusfähige, intelligente Sensoren," Messen und Prüfen, vol. 27, No. 7, pp. 332, 334–340, 1991.

Watt, "The Double–Distributed Control Network," Thesis submitted to Thayer School of Engineering, Dartmouth College, Hanover, N.H. (Jan. 1984).

Zielinski et al., "Asset Management Using Fieldbus," Fisher–Rosemount Systems, Inc, pp. 1–14 (1997).

"Advanced Systems Simplify Control," Machine Design, vol. 68, No. 12, pp. 118, 120 (Jul. 11, 1996).

Black, "Combining Lan Technology with Smart Sensors to Provide Predictive Maintenance, Diagnostics and Alarm Systems," Proceedings of the Industrial Computing Conference, Chicago, vol. 3, Sep. 19, 1993, Industrial Computing Society/Instrument Society of America, pp. 345–354 (1993).

Zielinski, "Issues for Digital Field Instrument Networks," Intech, pp. 92–94 (1989).

PCT International Search Report for PCT/US 97/17983 mailed Feb. 20, 1998.

PCT Written Opinion issued in PCT application PCT/US97/17983 dated Jul. 20, 1998.

PROCESS CONTROL NETWORK WITH REDUNDANT FIELD DEVICES AND BUSES

RELATED APPLICATION

This is a continuation-in-part of U.S. patent application Ser. No. 08/726,266 filed Oct. 4, 1996, now abandoned.

FIELD OF THE INVENTION

The present invention relates generally to process control networks and, more specifically, to a process control network that implements process control functions in a distributed manner using redundant functional elements such as field devices and communication busses.

DESCRIPTION OF THE RELATED ART

Large processes such as chemical, petroleum, and other manufacturing and refining processes include numerous field devices disposed at various locations to measure and control parameters of a process to thereby effect control of the process. These field devices may be, for example, sensors such as temperature, pressure, and flow rate sensors as well as control elements such as valves and switches. Historically, the process control industry used manual operations like manually reading level and pressure gauges, turning valve wheels, etc., to operate the measurement and control field devices within a process. Beginning in the 20th century, the process control industry began using local pneumatic control, in which local pneumatic controllers, transmitters, and valve positioners were placed at various locations within a process plant to effect control of certain plant locations. With the emergence of the microprocessor-based distributed control system (DCS) in the 1970's, distributed electronic process control became prevalent in the process control industry.

As is known, a DCS includes an analog or a digital computer, such as a programmable logic controller, connected to numerous electronic monitoring and control devices, such as electronic sensors, transmitters, current-to-pressure transducers, valve positioners, etc. located throughout a process. The DCS computer stores and implements a centralized and, frequently, complex control scheme to effect measurement and control of devices within the process to thereby control process parameters according to some overall control scheme. Usually, however, the control scheme implemented by a DCS is proprietary to the DCS controller manufacturer which, in turn, makes the DCS difficult and expensive to expand, upgrade, reprogram, and service because the DCS provider must become involved in an integral way to perform any of these activities. Furthermore, the equipment that can be used by or connected within any particular DCS may be limited due to the proprietary nature of DCS controller and the fact that a DCS controller provider may not support certain devices or functions of devices manufactured by other vendors.

To overcome some of the problems inherent in the use of proprietary DCSs, the process control industry has developed a number of standard, open communication protocols including, for example, the HART®, PROFIBUS®, WORLDFIP®, Device-Net®, and CAN protocols, which enable field devices made by different manufacturers to be used together within the same process control network. In fact, any field device that conforms to one of these protocols can be used within a process to communicate with and to be controlled by a DCS controller or other controller that supports the protocol, even if that field device is made by a different manufacturer than the manufacturer of the DCS controller.

Moreover, there is now a move within the process control industry to decentralize process control and, thereby, simplify DCS controllers or eliminate the need for DCS controllers to a large extent. Decentralized control is obtained by having field mounted process control devices, such as valve positioners, transmitters, etc. perform one or more process control functions and by then communicating data across a bus structure for use by other process control devices in performing other control functions. To implement these control functions, each process control device includes a microprocessor having the capability to perform a control function as well as the ability to communicate with other process control devices using a standard and open communication protocol. In this manner, field devices made by different manufacturers can be interconnected within a process control network to communicate with one another and to perform one or more process control functions forming a control loop without the intervention of a DCS controller. The all-digital, two-wire bus protocol now being promulgated by the Fieldbus Foundation, known as the FOUNDATION™ Fieldbus (hereinafter "Fieldbus") protocol is one open communication protocol that allows devices made by different manufacturers to interoperate and communicate with one another via a standard bus to effect decentralized control within a process.

No matter what the communication protocol, process control elements, such as fluid control valves, are commonly used in harsh process control environments in which temperature and pressure ranges are vary widely. Applications of fluid control valves for which harsh environments are common include oil and gas pipeline applications, nuclear power generating stations, and various process control applications. In such environments, substantial maintenance is common including periodic preventative maintenance, maintenance due to valve breakdown, and testing to verify that valves are functioning properly.

Control elements fatigue or fail in these harsh environments and must be occasionally replaced. Both the failure of a control element and the replacement of a control element typically requires shutdown of the process control system which is highly expensive and time-consuming due to the long time intervals necessary to bring the process control system to a stable condition following the shutdown.

It is desirable, therefore, to provide an apparatus and operating method that allows a process control network using, for example, a two-wire, loop-powered, two-way digital communication protocol or any other distributed process function protocol to remain operational despite the failure or replacement of functional elements in the network.

SUMMARY OF THE INVENTION

According to the present invention, functional elements within a process control system, such as a two-wire, loop-powered, two-way digital communications environment, are interconnected using selective redundant connections and selective redundant functional elements. The redundant functional elements and redundant connections provide a smooth transition from operation of a primary process loop element to a secondary process loop element in the event of a failure of the primary process loop element.

According to one aspect of the present invention, redundancy is selectively implemented using two sets of communication media including a redundant bus pair having a primary bus and a redundant bus. In accordance with another aspect of the present invention, redundancy is selectively implemented using a single set of communication media, such as a single communication bus, but implementing redundant devices, such as field devices, so that recovery is achieved upon failure of a device or other functional element, such as a function block, but not for failure of the communication media. In one embodiment, a loop controller, such as a digital control system (DCS) controller or a field device, controls the redundancy operation of a single communication loop having redundant functional elements therein. In this embodiment, the loop controller is connected to a single communication bus and the single communication bus is connected to a redundant pair of functional elements such as devices. Selected functional elements, such as control logic, detect a failure status and communicate this status to a controller, or the controller detects a cessation of communications from a failed one of the redundant functional elements and then automatically reconfigures the communication loop, to thereby restore the communication status.

According to a further aspect of the present invention, redundancy is selectively implemented using a redundant set of communication media in addition to the use of other redundant functional elements such as devices so that recovery is attained both for a failing device and a failing communication media. In accordance with the present invention, a loop controller, such as a digital control system (DCS) controller or a field device, controls the redundancy operation of a redundant pair of communication loops having redundant buses connected to redundant devices. The loop controller is connected to both a primary bus and a redundant bus of the redundant pair of communication loops and the redundant devices are connected to the redundant buses such that a primary device is connected to the primary loop and a redundant device is connected to the redundant loop. Selected functional elements detect and communicate a failure status to the loop controller or the loop controller detects a cessation of communications from a failed functional element. In the event of a failure, e.g., when the controller or control logic detects a failed functional element (either a bus or a device) or the loop controller detects a cessation of communications from an element, the loop controller automatically reconfigures the redundant pair of communication loops to restore communication status.

According to a still further aspect of the present invention, redundancy is selectively implemented using a redundant set of communication media connected to a single device so that recovery is attained for a failing communication media but not for a failing device. In accordance with the present invention, a loop controller, such as a digital control system (DCS) controller or a field device, controls the redundancy operation of the redundant communication media. The loop controller is connected to both a primary and a redundant bus of the redundant pair of communication media while a plurality of other functional elements such as devices are connected to the redundant pair of communication media. Selected functional elements detect a bad communication status and the loop controller detects a cessation of communications. In this configuration, the loop controller automatically reconfigures the redundant pair of communication media when a functional element detects a bad communication status or the loop controller detects a cessation of communications from an element to thereby restore communication status.

Many advantages are achieved by the described process control system and operating method. For example, it is advantageous that shutdown of a process control line is avoided when a process device or a communication bus experiences problems. It is also advantageous that self-diagnostic functionality of functional elements within the process control system is exploited to disable failing elements and to enable replacement of functional elements automatically. Likewise, it is advantageous that the two-way communication protocol of the process control system is exploited so that redundant functional elements are automatically activated upon failure of a primary functional element.

DESCRIPTION OF THE PREFERRED EMBODIMENTS

Figure 1:
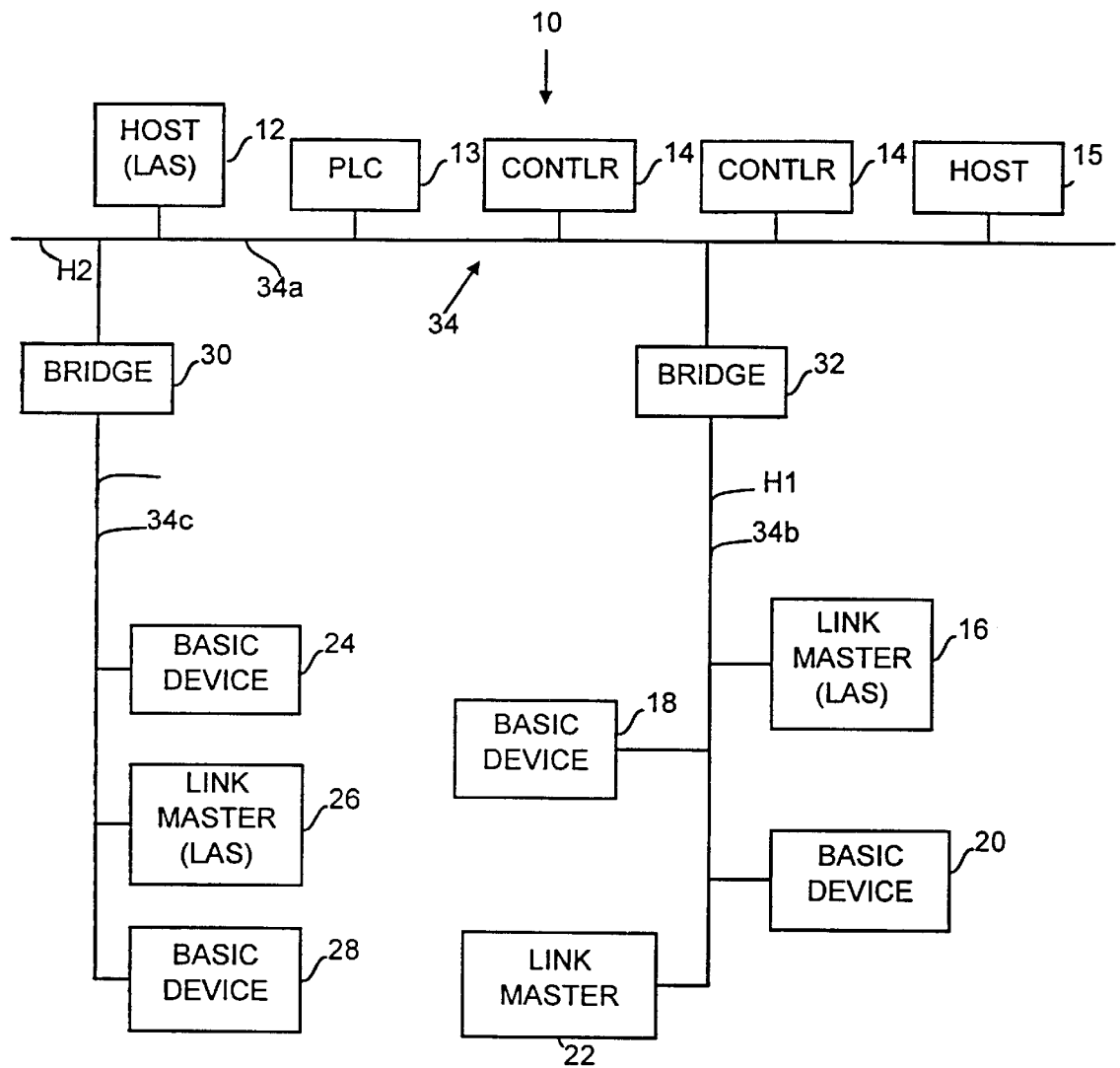
FIG. 1 is a schematic block diagram of an example process control network using the Fieldbus protocol.

While the process control network having redundant field devices and busses of the present invention is described in detail as a process control network that implements process control functions in a decentralized or distributed manner using a set of Fieldbus devices, it should be noted that the process control network having redundant features of the present invention can be a process control network that performs distributed control functions using other types of field devices and communication protocols, including protocols that rely on other than two-wire buses and protocols that support analog and digital communications. Thus, for example, the process control network having redundant features of the present invention can be any process control network that performs distributed control functions even if this process control network uses the HART, PROFIBUS, etc. communication protocols or any other communication protocols that now exist or that may be developed in the future.

Before discussing the details of the process control network having redundant features of the present invention, a general description the Fieldbus protocol, field devices configured according to this protocol, and the way in which communication occurs in a process control network that uses the Fieldbus protocol will be provided. However, it should be understood that, while the Fieldbus protocol is a relatively new all-digital communication protocol developed for use in process control networks, this protocol is known in the art and is described in detail in numerous articles, brochures and specifications published, distributed, and available from, among others, the Fieldbus Foundation, a not-for-profit organization headquartered in Austin, Tex. In particular, the Fieldbus protocol, and the manner of communicating with and storing data in devices using the Fieldbus protocol, is described in detail in the manuals entitled Communications Technical Specification and User Layer Technical Specification from the Fieldbus Foundation, which are hereby incorporated by reference in their entirety herein.

The Fieldbus protocol is an all-digital, serial, two-way communication protocol that provides a standardized physical interface to a two-wire loop or bus interconnecting "field" equipment such as sensors, actuators, controllers, valves, etc. located in an instrumentation or process control environment of, for example, a factory or a plant. The Fieldbus protocol provides, in effect, a local area network for field instruments (field devices) within a process, which enables these field devices to perform control functions at locations distributed throughout a process facility and to communicate with one another before and after the performance of these control functions to implement an overall control strategy. Because the Fieldbus protocol enables control functions to be distributed throughout a process control network, it reduces the workload of, or entirely eliminates the necessity of the centralized process controller typically associated with a DCS.

Referring to FIG. 1, a process control network 10 using the Fieldbus protocol may include a host 12 connected to a number of other devices such as a program logic controller (PLC) 13, a number of controllers 14, another host device 15 and a set of field devices 16, 18, 20, 22, 24, 26, 28, 30, and 32 via a two-wire Fieldbus loop or bus 34. The bus 34 includes different sections or segments, 34a, 34b, and 34c which are separated by bridge devices 30 and 32. Each of the sections 34a, 34b, and 34c interconnects a subset of the devices attached to the bus 34 to enable communications between the devices in a manner described hereinafter. Of course, the network of FIG. 1 is illustrative only, there being many other ways in which a process control network may be configured using the Fieldbus protocol. Typically, a configurer is located in one of the devices, such as the host 12, and is responsible for setting up or configuring each of the devices (which are "smart" devices in that they each include a microprocessor capable of performing communication and, in some cases, control functions) as well as recognizing when new field devices are connected to the bus 34, when field devices are removed from the bus 34, recognizing data generated by the field devices 16–32, and interfacing with one or more user terminals, which may be located in the host 12 or in any other device connected to the host 12 in any manner.

The bus 34 supports or allows two-way, purely digital communication and may also provide a power signal to any or all of the devices connected thereto, such as the field devices 16–32. Alternatively, any or all of the devices 12–32 may have their own power supplies or may be connected to external power supplies via separate wires (not shown). While the devices 12–32 are illustrated in FIG. 1 as being connected to the bus 34 in a standard bus-type connection, in which multiple devices are connected to the same pair of wires making up the bus segments 34a, 34b, and 34c, the Fieldbus protocol allows other device/wire topologist including point-to-point connections, in which each device is connected to a controller or a host via a separate two-wire pair (similar to typical 4–20 mA analog DCS systems), and tree or "spur" connections in which each device is connected to a common point in a two-wire bus which may be, for example, a junction box or a termination area in one of the field devices within a process control network.

Data may be sent over the different bus segments 34a, 34b, and 34c at the same or different communication baud rates or speeds according to the Fieldbus protocol. For example, the Fieldbus protocol provides a 31.25 Kbit/s communication rate (H1), illustrated as being used by the bus segments 34b and 34c of FIG. 1, and a 1.0 Mbit/s and/or a 2.5 Mbit/s (H2) communication rate, which will be typically used for advanced process control, remote input/output, and high speed factory automation applications and is illustrated as being used by the bus segment 34a of FIG. 1. Likewise, data may be sent over the bus segments 34a, 34b, and 34c according to the Fieldbus protocol using voltage mode signaling or current mode signaling. Of course, the maximum length of each segment of the bus 34 is not strictly limited but is, instead, determined by the communication rate, cable type, wire size, bus power option, etc. of that section.

The Fieldbus protocol classifies the devices that can be connected to the bus 34 into three primary categories, namely, basic devices, link master devices, and bridge devices. Basic devices (such as devices 18, 20, 24, and 28 of FIG. 1) can communicate, that is, send and receive communication signals on or from the bus 34, but are not capable of controlling the order or timing of communication that occurs on the bus 34. Link master devices (such as devices 16, 22, and 26 as well as the host 12 of FIG. 1) are devices that communicate over the bus 34 and are capable of controlling the flow of and the timing of communication signals on the bus 34. Bridge devices (such as devices 30 and 32 of FIG. 1) are devices configured to communicate on and to interconnect individual segments or branches of a Fieldbus bus to create larger process control networks. If desired, bridge devices may convert between different data speeds and/or different data signaling formats used on the different segments of the bus 34, may amplify signals traveling between the segments of the bus 34, may filter the signals flowing between the different segments of the bus 34 and pass only those signals destined to be received by a device on one of the bus segments to which the bridge is coupled and/or may take other actions necessary to link different segments of the bus 34. Bridge devices that connect bus segments that operate at different speeds must have link master capabilities at the lower speed segment side of the bridge. The hosts 12 and 15, the PLC 13, and the controllers 14 may be any type of fieldbus device but, typically, will be link master devices.

Each of the devices 12–32 is capable of communicating over the bus 34 and, importantly, is capable of independently performing one or more process control functions using data acquired by the device, from the process, or from a different device via communication signals on the bus 34. Fieldbus devices are, therefore, capable of directly implementing portions of an overall control strategy which, in the past, were performed by a centralized digital controller of a DCS. To perform control functions, each Fieldbus device includes one or more standardized "blocks" which are implemented in a microprocessor within the device. In particular, each Fieldbus device includes one resource block, zero or more function blocks, and zero or more transducer blocks. These blocks are referred to as block objects.

A resource block stores and communicates device specific data pertaining to some of the characteristics of a Fieldbus device including, for example, a device type, a device revision indication, and indications of where other device specific information may be obtained within a memory of the device. While different device manufacturers may store different types of data in the resource block of a field device, each field device conforming to the Fieldbus protocol includes a resource block that stores some data.

A function block defines and implements an input function, an output function, or a control function associated with the field device and, thus, function blocks are generally referred to as input, output, and control function blocks. However, other categories of function blocks such as hybrid function blocks may exist or may be developed in the future. Each input or output function block produces at least one process control input (such as a process variable from a process measurement device) or process control output (such as a valve position sent to an actuation device) while each control function block uses an algorithm (which may be proprietary in nature) to produce one or more process outputs from one or more process inputs and control inputs. Examples of standard function blocks include analog input (AI), analog output (AO), bias (B), control selector (CS), discrete input (DI), discrete output (DO), manual loader (ML), proportional/derivative (PD), proportional/integral/ derivative (PID), ratio (RA), and signal selector (SS) function blocks. However, other types of function blocks exist and new types of function blocks may be defined or created to operate in the Fieldbus environment.

A transducer block couples the inputs and outputs of a function block to local hardware devices, such as sensors and device actuators, to enable function blocks to read the outputs of local sensors and to command local devices to perform one or more functions such as moving a valve member. Transducer blocks typically contain information that is necessary to interpret signals delivered by a local device and to properly control local hardware devices including, for example, information identifying the type of a local device, calibration information associated with a local device, etc. A single transducer block is typically associated with each input or output function block.

Most function blocks are capable of generating alarm or event indications based on predetermined criteria and are capable of operating differently in different modes. Generally speaking, function blocks may operate in an automatic mode, in which, for example, the algorithm of a function block operates automatically; an operator mode in which the input or output of a function block, is controlled manually; an out-of-service mode in which the block does not operate; a cascade mode in which the operation of the block is affected from (determined by) the output of a different block; and one or more remote modes in which a remote computer determines the mode of the block. However, other modes of operation exist in the Fieldbus protocol.

Importantly, each block is capable of communicating with other blocks in the same or different field devices over the Fieldbus bus 34 using standard message formats defined by the Fieldbus protocol. As a result, combinations of function blocks (in the same or different devices) may communicate with each other to produce one or more decentralized control loops. Thus, for example, a PID function block in one field device may be connected via the bus 34 to receive an output of an AI function block in a second field device, to deliver data to an AO function block in third field device, and to receive an output of the AO function block as feedback to create a process control loop separate and apart from any DCS controller. In this manner, combinations of function blocks move control functions out of a centralized DCS environment, which allows DCS multi-function controllers to perform supervisory or coordinating functions or to be eliminated altogether. Furthermore, function blocks provide a graphical, block-oriented structure for easy configuration of a process and enable the distribution of functions among field devices from different suppliers because these blocks use a consistent communication protocol.

In addition to containing and implementing block objects, each field device includes one or more other objects including link objects, trend objects, alert objects, and view objects. Link objects define the links between the inputs and outputs of blocks (such as function blocks) both internal to the field device and across the Fieldbus bus 34.

Trend objects allow local trending of function block parameters for access by other devices such as the host 12 or controllers 14 of FIG. 1. Trend objects retain short-term historical data pertaining to some, for example, function block parameter and report this data to other devices or function blocks via the bus 34 in an asynchronous manner. Alert objects report alarms and events over the bus 34. These alarms or events may relate to any event that occurs within a device or one of the blocks of a device. View objects are predefined groupings of block parameters used in standard human/machine interfacing and may be sent to other devices for viewing from time to time.

Figure 2:
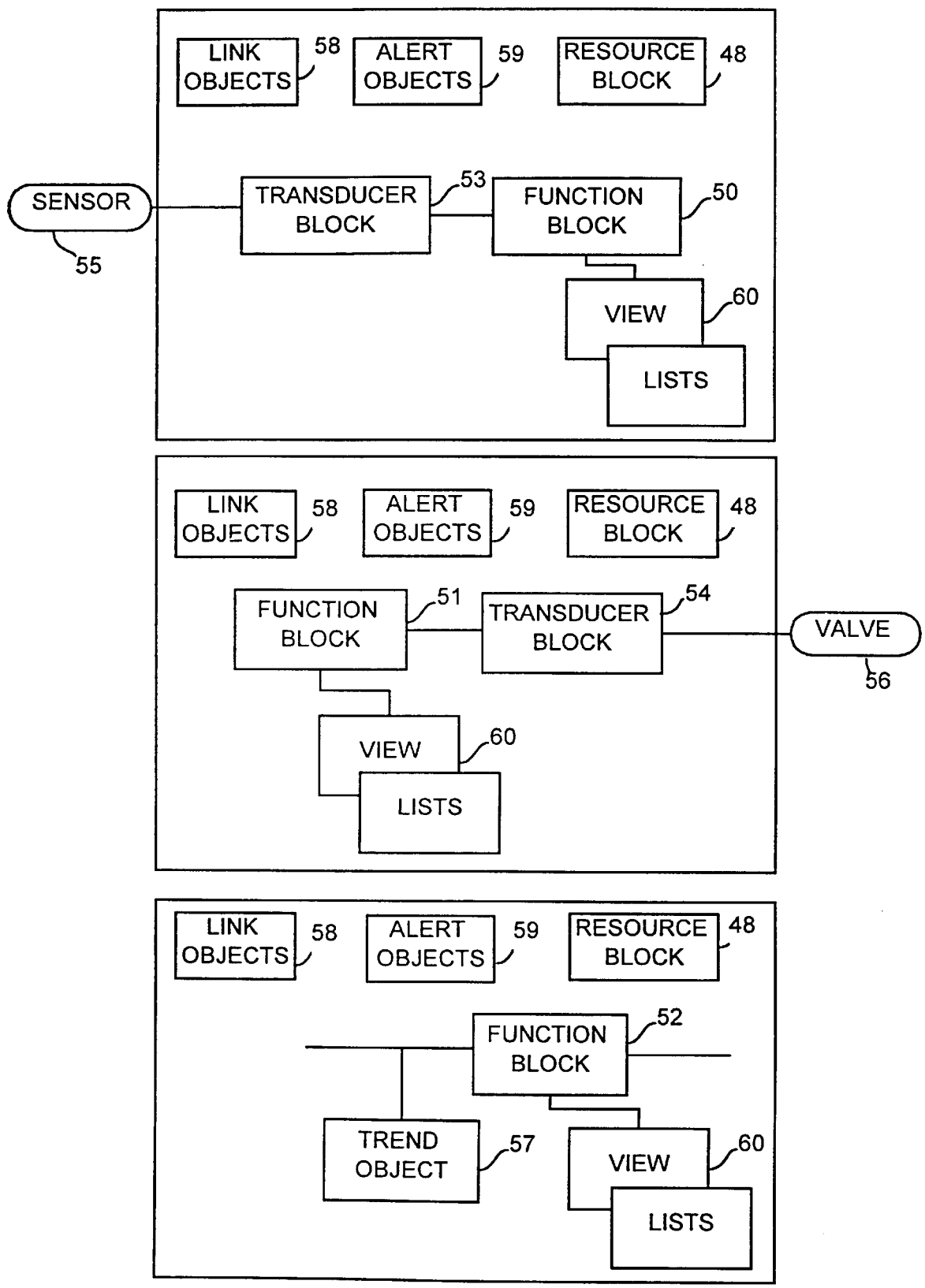
FIG. 2 is a schematic block diagram of three Fieldbus devices having function blocks therein.

Referring now to FIG. 2, three Fieldbus devices, which may be, for example, any of the field devices 16–28 of FIG. 1, are illustrated as including resource blocks 48, function blocks 50, 51, or 52 and transducer blocks 53 and 54. In the first device, the function block 50 (which may be an input function block) is coupled through the transducer block 53 to a sensor 55, which may be, for example, a temperature sensor, a set point indication sensor, etc. In the second device, the function block 51 (which may be an output function block) is coupled through the transducer block 54 to an output device such as a valve 56. In the third device, function block 52 (which may be a control function block) has a trend object 57 associated therewith for trending the input parameter of the function block 52.

Link objects 58 define the block parameters of each of the associated blocks and alert objects 59 provide alarms or event notifications for the each of the associated blocks. View objects 60 are associated with each of the function blocks 50, 51, and 52 and include or group data lists for the function blocks with which they are associated. These lists contain information necessary for each of a set of different defined views. Of course, the devices of FIG. 2 are merely exemplary and other numbers of and types of block objects, link objects, alert objects, trend objects, and view objects may be provided in any field device.

Figure 3:
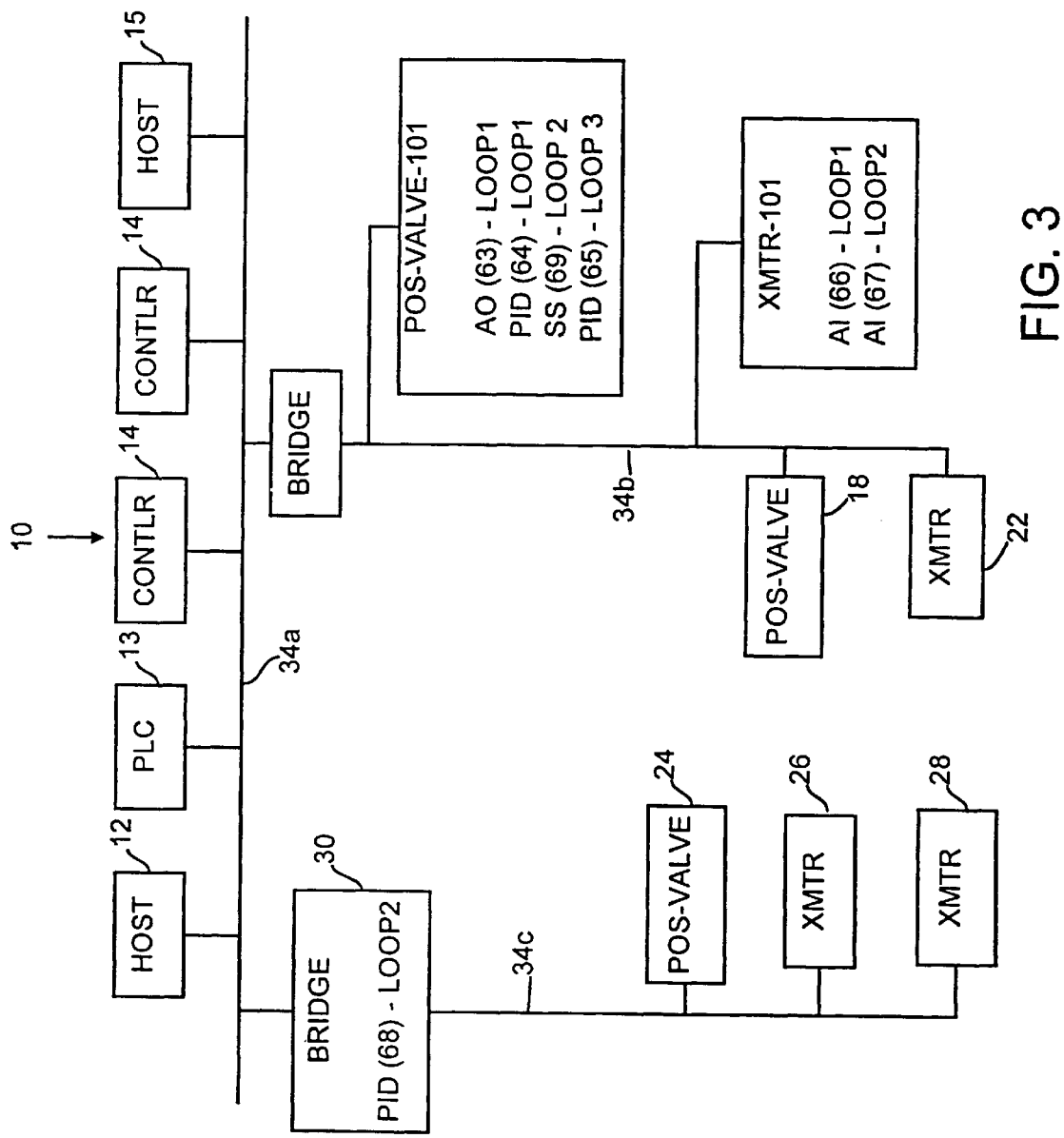
FIG. 3 is a schematic block diagram illustrating the function blocks within some of the devices of the process control network of FIG. 1.

Referring now to FIG. 3, a block diagram of the process control network 10 depicting the devices 16, 18, and 24 as positioner/valve devices and the devices 20, 22, 26, and 28 as transmitters also illustrates the function blocks associated with the positioner/valve 16, the transmitter 20, and the bridge 30. As illustrated in FIG. 3, the positioner/valve 16 includes a resource (RSC) block 61, a transducer (XDCR) block 62, and a number of function blocks including an analog output (AO) function block 63, two PID function blocks 64 and 65, and a signal select (SS) function block 69. The transmitter 20 includes a resource block 61, two transducer blocks 62, and two analog input (AI) function blocks 66 and 67. Also, the bridge 30 includes a resource block 61 and a PID function block 68.

As will be understood, the different function blocks of FIG. 3 may operate together (by communicating over the bus 34) in a number of control loops and the control loops in which the function blocks of the positioner/valve 16, the transmitter 20, and the bridge 30 are located are identified in FIG. 3 by a loop identification block connected to each of these function blocks. Thus, as illustrated in FIG. 3, the AO function block 63 and the PID function block 64 of the positioner/valve 16 and the AI function block 66 of the transmitter 20 are connected within a control loop indicated as LOOP1, while the SS function block 69 of the positioner/valve 16, the AI function block 67 of the transmitter 20, and the PID function block 68 of the bridge 30 are connected in a control loop indicated as LOOP2. The other PID function block 65 of the positioner/valve 16 is connected within a control loop indicated as LOOP3.

Figure 4:
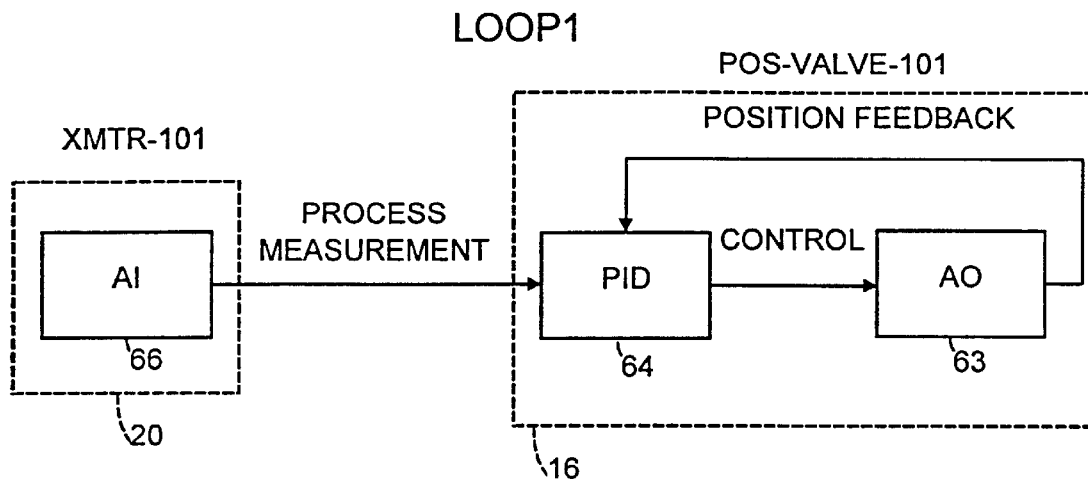
FIG. 4 is a control loop schematic for a process control loop within the process control network of FIG. 1.

The interconnected function blocks making up the control loop indicated as LOOP1 in FIG. 3 are illustrated in more detail in the schematic of this control loop depicted in FIG. 4. As can be seen from FIG. 4, the control loop LOOP1 is completely formed by communication links between the AO function block 63 and the PID function block 64 of the positioner/valve 16 and the AI function block 66 of the transmitter 20 (FIG. 3). The control loop diagram of FIG. 4 illustrates the communication interconnections between these function blocks using lines attaching the process and control inputs and outputs of these functions blocks. Thus, the output of the AI function block 66, which may comprise a process measurement or process parameter signal, is communicatively coupled via the bus segment 34b to the input of the PID function block 64 which has an output comprising a control signal communicatively coupled to an input of the AO function block 63. An output of the AO function block 63, which comprises a feedback signal indicating, for example, the position of the valve 16, is connected to a control input of the PID function block 64. The PID function block 64 uses this feedback signal along with the process measurement signal from the AI function block 66 to implement proper control of the AO function block 63. Of course the connections indicated by the lines in the control loop diagram of FIG. 4 may be performed internally within a field device when, as with the case of the AO and the PID function blocks 63 and 64, the function blocks are within the same field device (e.g., the positioner/valve 16), or these connections may be implemented over the two-wire communication bus 34 using standard Fieldbus synchronous communications. Of course, other control loops are implemented by other function blocks that are communicatively interconnected in other configurations.

To implement and perform communication and control activities, the Fieldbus protocol uses three general categories of technology identified as a physical layer, a communication "stack," and a user layer. The user layer includes the control and configuration functions provided in the form of blocks (such as function blocks) and objects within any particular process control device or field device. The user layer is typically designed in a proprietary manner by the device manufacturer but must be capable of receiving and sending messages according to the standard message format defined by the Fieldbus protocol and of being configured by a user in standard manners. The physical layer and the communication stack are necessary to effect communication between different blocks of different field devices in a standardized manner using the two-wire bus 34 and may be modeled by the well-known Open Systems Interconnect (OSI) layered communication model.

The physical layer, which corresponds to OSI layer 1, is embedded in each field device and the bus 34 and operates to convert electromagnetic signals received from the Fieldbus transmission medium (the two-wire bus 34) into messages capable of being used by the communication stack of the field device. The physical layer may be thought of as the bus 34 and the electromagnetic signals present on the bus 34 at the inputs and outputs of the field devices.

The communication stack, which is present in each Fieldbus device, includes a data link layer, which corresponds to OSI layer 2, a Fieldbus access sublayer, and a Fieldbus message specification layer, which corresponds to OSI layer 6. There is no corresponding structure for OSI layers 3–5 in the Fieldbus protocol. However, the applications of a fieldbus device comprise a layer 7 while a user layer is a layer 8, not defined in the OSI protocol. Each layer in the communication stack is responsible for encoding or decoding a portion of the message or signal that is transmitted on the Fieldbus bus 34. As a result, each layer of the communication stack adds or removes certain portions of the Fieldbus signal such as preambles, start delimiters, and end delimiters and, in some cases, decodes the stripped portions of the Fieldbus signal to identify where the rest of the signal or message should be sent or if the signal should be discarded because, for example, it contains a message or data for function blocks that are not within the receiving field device.

The data link layer controls transmission of messages onto the bus 34 and manages access to the bus 34 according to a deterministic centralized bus scheduler called a link active scheduler, to be described in more detail below. The data link layer removes a preamble from the signals on the transmission medium and may use the received preamble to synchronize the internal clock of the field device with the incoming Fieldbus signal. Likewise, the data link layer converts messages on the communication stack into physical Fieldbus signals and encodes these signals with clock information to produce a "synchronous serial" signal having a proper preamble for transmission on the two-wire bus 34. During the decoding process, the data link layer recognizes special codes within the preamble, such as start delimiters and end delimiters, to identify the beginning and the end of a particular Fieldbus message and may perform a checksum to verify the integrity of the signal or message received from the bus 34. Likewise, the data link layer transmits Fieldbus signals on the bus 34 by adding start and end delimiters to messages on the communication stack and placing these signals on the transmission medium at the appropriate time.

The Fieldbus message specification layer allows the user layer (i.e., the function blocks, objects, etc. of a field device) to communicate across the bus 34 using a standard set of message formats and describes the communication services, message formats, and protocol behaviors required to build messages to be placed onto the communication stack and to be provided to the user layer. Because the Fieldbus message specification layer supplies standardized communications for the user layer, specific Fieldbus message specification communication services are defined for each type of object described above. For example, the Fieldbus message specification layer includes object dictionary services which allows a user to read an object dictionary of a device. The object dictionary stores object descriptions that describe or identify each of the objects (such as block objects) of a device. The Fieldbus message specification layer also provides context management services which allows a user to read and change communication relationships, known as virtual communication relationships (VCRs) described hereinafter, associated with one or more objects of a device. Still further, the Fieldbus message specification layer provides variable access services, event services, upload and download services, and program invocation services, all of which are well known in the Fieldbus protocol and, therefore, will not be described in more detail herein. The Fieldbus access sublayer maps the Fieldbus message specification layer into the data link layer.

To allow or enable operation of these layers, each Fieldbus device includes a management information base (MIB), which is a database that stores VCRs, dynamic variables, statistics, link active scheduler timing schedules, function block execution timing schedules and device tag and address information. Of course, the information within the MIB may be accessed or changed at any time using standard Fieldbus messages or commands. Furthermore, a device description is usually provided with each device to give a user or a host an extended view of the information in the VFD. A device description, which must typically be tokenized to be used by a host, stores information needed for the host to understand the meaning of the data in the VFDs of a device.

As will be understood, to implement any control strategy using function blocks distributed throughout a process control network, the execution of the function blocks must be precisely scheduled with respect to the execution of other function blocks in a particular control loop. Likewise, communication between different function blocks must be precisely scheduled on the bus 34 so that the proper data is provided to each function block before that block executes.

The way in which different field devices (and different blocks within field devices) communicate over the Fieldbus transmission medium will now be described with respect to FIG. 1. For communication to occur, one of the link master devices on each segment of the bus 34 (for example, devices 12, 16, and 26) operates as a link active scheduler (LAS) which actively schedules and controls communication on the associated segment of the bus 34. The LAS for each segment of the bus 34 stores and updates a communication schedule (a link active schedule) containing the times that each function block of each device is scheduled to start periodic communication activity on the bus 34 and the length of time for which this communication activity is to occur. While there may be one and only one active LAS device on each segment of the bus 34, other link master devices (such as the device 22 on the segment 34b) may serve as backup LASs and become active when, for example, the current LAS fails. Basic devices do not have the capability to become an LAS at any time.

Generally speaking, communication activities over the bus 34 are divided into repeating macrocycles, each of which includes one synchronous communication for each function block active on any particular segment of the bus 34 and one or more asynchronous communications for one or more of the functions blocks or devices active on a segment of the bus 34. A device may be active, i.e., send data to and receive data from any segment of the bus 34, even if it is physically connected to a different segment of the bus 34, through coordinated operation of the bridges and the LASs on the bus 34.

During each macrocycle, each of the function blocks active on a particular segment of the bus 34 executes, usually at a different, but precisely scheduled (synchronous) time and, at another precisely scheduled time, publishes its output data on that segment of the bus 34 in response to a compel data command generated by the appropriate LAS. Preferably, each function block is scheduled to publish its output data shortly after the end of the execution period of the function block. Furthermore, the data publishing times of the different function blocks are scheduled serially so that no two function blocks on a particular segment of the bus 34 publish data at the same time. During the time that synchronous communication is not occurring, each field device is allowed, in turn, to transmit alarm data, view data, etc. in an asynchronous manner using token driven communications. The execution times and the amount of time necessary to complete execution of each function block are stored in the management information base (MIB) of the device in which the function block resides while, as noted above, the times for sending the compel data commands to each of the devices on a segment of the bus 34 are stored in the MIB of the LAS device for that segment. These times are typically stored as offset times because they identify the times at which a function block is to execute or send data as an offset from the beginning of an "absolute link schedule start time," which is known by all of the devices connected to the bus 34.

To effect communications during each macrocycle, the LAS, for example, the LAS 16 of the bus segment 34b, sends a compel data command to each of the devices on the bus segment 34b according to the list of transmit times stored in the link active schedule. Upon receiving a compel data command, a function block of a device publishes its output data on the bus 34 for a specific amount of time. Because each of the functions blocks is typically scheduled to execute so that execution of that block is completed shortly before the block is scheduled to receive a compel data command, the data published in response to a compel data command should be the most recent output data of the function block. However, if a function block is executing slowly and has not latched new outputs when it receives the compel data command, the function block publishes the output data generated during the last run of the function block and indicates that the published data is old data using a time-stamp.

After the LAS has sent a compel data command to each of the function blocks on particular segment of the bus 34 and during the times that function blocks are executing, the LAS may cause asynchronous communication activities to occur. To effect asynchronous communication, the LAS sends a pass token message to a particular field device. When a field device receives a pass token message, that field device has full access to the bus 34 (or a segment thereof) and can send asynchronous messages, such as alarm messages, trend data, operator set point changes, etc. until the messages are complete or until a maximum allotted "token hold time" has expired. Thereafter the field device releases the bus 34 (or any particular segment thereof) and the LAS sends a pass token message to another device. This process repeats until the end of the macrocycle or until the LAS is scheduled to send a compel data command to effect synchronous communication. Of course, depending on the amount of message traffic and the number of devices and blocks coupled to any particular segment of the bus 34, not every device may receive a pass token message during each macrocycle.

Figure 5:
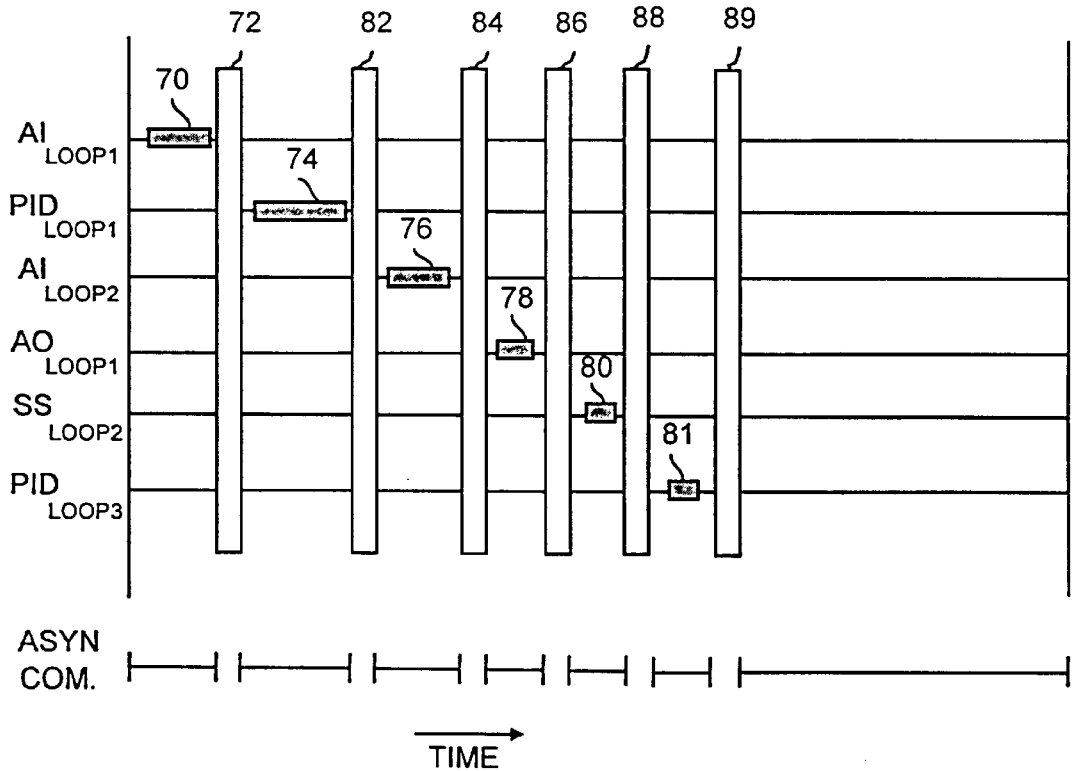
FIG. 5 is a timing schematic for a macrocycle of a segment of the bus of the process control network of FIG. 1.

FIG. 5 illustrates a timing schematic depicting the times at which function blocks on the bus segment 34b of FIG. 1 execute during each macrocycle of the bus segment 34b and the times at which synchronous communications occur during each macrocycle associated with the bus segment 34b. In the timing schedule of FIG. 5, time is indicated on the horizontal axis and activities associated with the different function blocks of the positioner/valve 16 and the transmitter 20 (of FIG. 3) are illustrated on the vertical axis. The control loop in which each of the functions blocks operates is identified in FIG. 5 as a subscript designation. Thus $AI_{LOOP1}$ refers to the AI function block 66 of the transmitter 20, $PID_{LOOP1}$ refers to the PID function block 64 of the positioner/valve 16, etc. The block execution period of each of the illustrated function blocks is depicted by a cross-hatched box while each scheduled synchronous communication is identified by a vertical bar in FIG. 5.

Thus, according to the timing schedule of FIG. 5, during any particular macrocycle of the segment 34b (FIG. 1), the $AI_{LOOP1}$ function block executes first for the time period specified by the box 70. Then, during the time period indicated by the vertical bar 72. the output of the $AI_{LOOP1}$ function block is published on the bus segment 34b in response to a compel data command from the LAS for the bus segment 34b. Likewise, the boxes 74, 76, 78, 80, and 81 indicate the execution times of the function blocks $PID_{LOOP1}$, $AI_{LOOP2}$, $AO_{LOOP1}$, $SS_{LOOP2}$, and $PID_{LOOP3}$, respectively (which are different for each of the different blocks), while the vertical bars 82, 84, 86, 88, and 89 indicate the times that the function blocks $PID_{LOOP1}$, $AI_{LOOP2}$, $AO_{LOOP1}$, $SS_{LOOP2}$, and $PID_{LOOP3}$, respectively, publish data on the bus segment 34b.

As will be apparent, the timing schematic of FIG. 5 also illustrates the times available for asynchronous communication activities, which may occur during the execution times of any of the function blocks and during the time at the end of the macrocycle during which no function blocks are executing and when no synchronous communication is taking place on the bus segment 34b. Of course, if desired, different function blocks can be intentionally scheduled to execute at the same time and not all function blocks must publish data on the bus if, for example, no other device subscribes to the data produced by a function block.

Field devices are able to publish or transmit data and messages over the bus 34 using one of three virtual communication relationships (VCRs) defined in the Fieldbus access sublayer of the stack of each field device. A client/server VCR is used for queued, unscheduled, user initiated, one to one, communications between devices on the bus 34. Such queued messages are sent and received in the order submitted for transmission, according to their priority, without overwriting previous messages. Thus, a field device may use a client/server VCR when it receives a pass token message from an LAS to send a request message to another device on the bus 34. The requester is called the "client" and the device that receives the request is called the "server." The server sends a response when it receives a pass token message from the LAS. The client/server VCR is used, for example, to effect operator initiated requests such as set point changes, tuning parameter access and changes, alarm acknowledgements, and device uploads and downloads.

A report distribution VCR is used for queued, unscheduled, user initiated, one to many communications. For example, when a field device with an event or a trend report receives a pass token from an LAS, that field device sends its message to a "group address" defined in the Fieldbus access sublayer of the communication stack of that device. Devices that are configured to listen on that VCR will receive the report. The report distribution VCR type is typically used by Fieldbus devices to send alarm notifications to operator consoles.

A publisher/subscriber VCR type is used for buffered, one to many communications. Buffered communications are ones that store and send only the latest version of the data and, thus, new data completely overwrites previous data. Function block outputs, for example, comprise buffered data. A "publisher" field device publishes or broadcasts a message using the publisher/subscriber VCR type to all of the "subscriber" field devices on the bus 34 when the publisher device receives a compel data message from the LAS or from a subscriber device. The publisher/subscriber relationships are predetermined and are defined and stored within the Fieldbus access sublayer of the communication stack of each field device.

To assure proper communication activities over the bus 34, each LAS periodically sends a time distribution message to all of the field devices connected to a segment of the bus 34, which enables the receiving devices to adjust their local application time to be in synchronization with one another. Between these synchronization messages, clock time is independently maintained in each device based on its own internal clock. Clock synchronization allows the field devices to time stamp data throughout the Fieldbus network to indicate, for example, when data was generated.

Furthermore, each LAS (and other link master device) on each bus segment stores a "live list," which is a list of all the devices that are connected to that segment of the bus 34, i.e., all of the devices that are properly responding to a pass token message. The LAS continually recognizes new devices added to a bus segment by periodically sending probe node messages to addresses that are not on the live list. In fact, each LAS is required to probe at least one address after it has completed a cycle of sending pass token messages to all of the field devices in the live list. If a field device is present at the probed address and receives the probe node message, the device immediately returns a probe response message. Upon receiving a probe response message, the LAS adds the device to the live list and confirms by sending a node activation message to the probed field device. A field device remains on the live list as long as that field device responds properly to pass token messages. However, an LAS removes a field device from the live list if the field device does not, after three successive tries, either use the token or immediately return the token to the LAS. When a field device is added to or removed from the live list, the LAS broadcasts changes in the live list to all the other link master devices on the appropriate segment of the bus 34 to allow each link master device to maintain a current copy of the live list.

As noted above, the communication interconnections between the field devices and the function blocks thereof are determined by a user and are implemented within the process control network 10 using a configuration application located in, for example, the host 12. However, after being configured, the process control network 10 operates without any consideration for device or process diagnostics and, therefore, interfaces with the host 12 to perform standard I/O functions.

Figure 6:
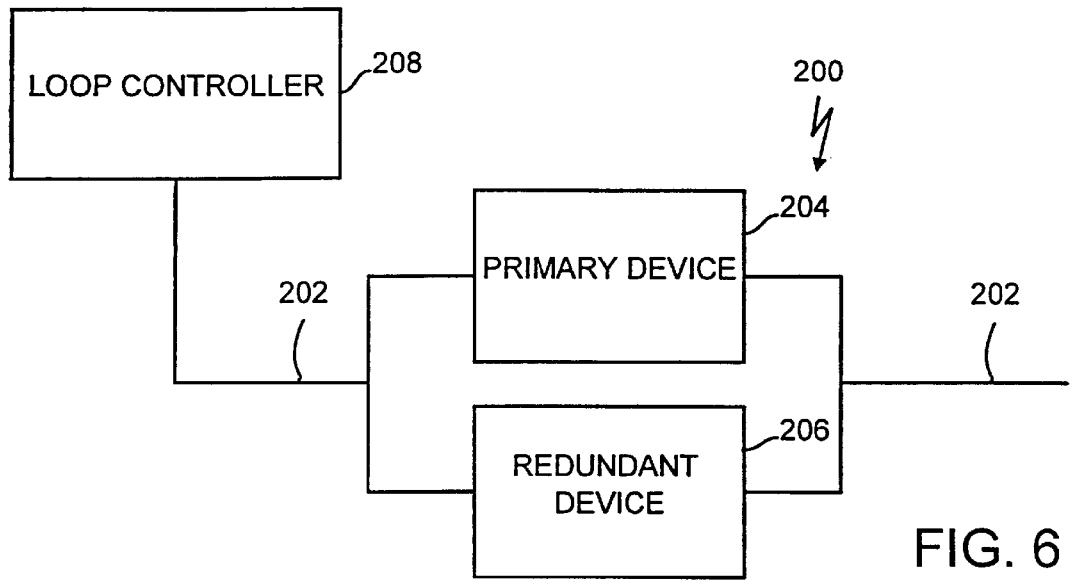
FIG. 6 is a schematic block diagram illustrating a control system network wherein redundancy is selectively implemented using a single set of communication media in combination with redundant devices.

Referring now to FIG. 6, a schematic block diagram illustrates a control system network 200 in which redundancy according to the present invention is selectively implemented using a single set of communication media in a single communication loop 202 with redundant functional elements including a primary field device 204 and a redundant field device 206. A loop controller 208, such as a digital control system (DCS) controller or a field device, is connected to the single communication loop 202 and the single communication loop 202 is connected to the redundant pair of field devices 204 and 206. The field devices 204 and 206 optionally detect and communicate a failure status. The loop controller 208 continuously monitors the operation of devices in the control system network 200 using two-way digital communications and detects a cessation of communications from a failed field device. The control system network 200 recovers from a failure of the primary field device 204 but not from the failure of the single set of communication media 202. The loop controller 208 controls the redundancy of operation of the single communication loop 202 in combination with redundant field devices 204 and 206 and detects the failure of a functional element, either by receipt of a failure status from one or more of the functional elements such as control logic within the devices or by detecting a discontinuance of messages from one or more of the functional elements. For example, a field device such as a process control valve includes a sensor and a feedback signal indicative of the status of the sensor which, in turn, is indicative of the status of operation of the process control valve. The status of the valve operation may include a designation of a failure status, an operational status, or a status indicative of varying degrees of functionality. The process control valve, and other selected functional elements, preferably utilize the two-way communications of the communication loop 202 to transmit a status message to the loop controller 208.

The loop controller 208 automatically reconfigures the redundant pair communication loop by deactivating a failed or failing device, such as the primary field device 204, and activating the corresponding alternative device, illustrated as the redundant field device 206. Functional elements may include sensing elements such as transmitters and control elements such as valves or motors as well as other field devices and control devices within a process. For sensing elements, transmissions from a failed transmitter are ignored. For a failed control element, the loop controller issues a command to deactivate the failed control element to a failsafe operating mode.

Figure 7:
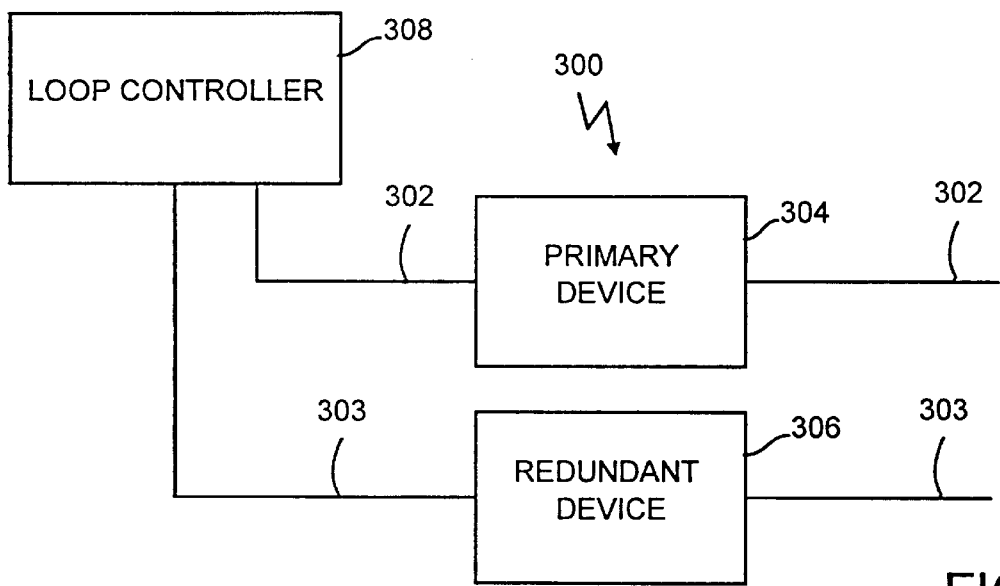
FIG. 7 is a schematic block diagram illustrating a control system network wherein redundancy is selectively implemented using a redundant communication media in combination with redundant devices.

Referring now to FIG. 7, a schematic block diagram illustrates a control system network 300 in which redundancy is selectively implemented using a redundant set of communication media including a primary communication bus 302 and a redundant communication bus 303 with redundant devices including a primary field device 304 and a redundant field device 306 connected thereto. A loop controller 308, such as a digital control system (DCS) controller or a field device, is connected to the primary communication bus 302 and to the redundant communication bus 303 to form a redundant pair of communication loops. The primary field device 304 and the redundant field device 306 optionally detect and communicate a failure status. The loop controller 308 controls the redundancy operation of the redundant communication loops by continuously monitoring the operation of devices in the control system network 300 using two-way digital communications and detects the failure of a functional element (which may be a bus or a device) either by receipt of a failure status from the functional element or by detecting a discontinuance of messages from the functional element. The loop controller 308 automatically reconfigures the redundant pair of communication. loops by deactivating a loop, such as that associated with the primary communication bus 302, or one or more of the elements within the primary loop upon failure of either the bus 302 or the primary field device 304 and by then activating the corresponding alternative loop (e.g., that associated with the redundant communication bus 303) and/or one or more functional devices on the bus 303, such as the redundant field device 306. Accordingly, recovery is attained both for a failing functional element and for a failing communication media.

Figure 8:
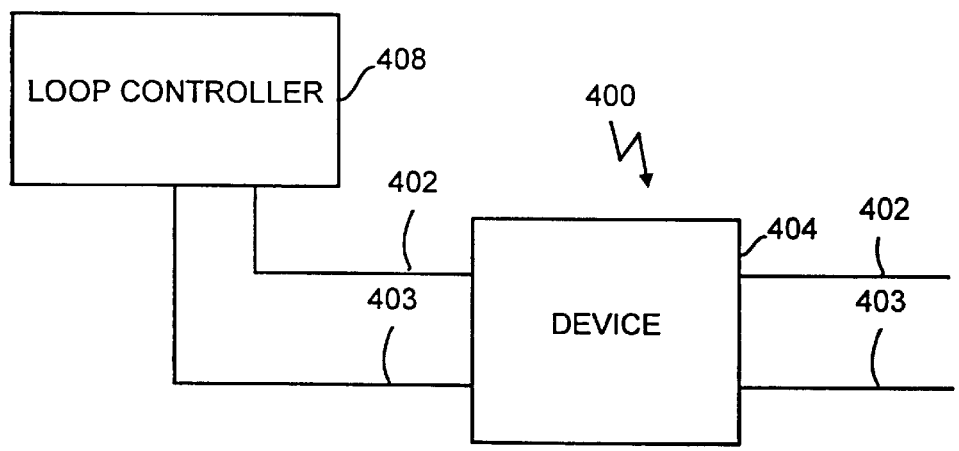
FIG. 8 is a schematic block diagram illustrating a control system network wherein redundancy is selectively implemented using a redundant communication media in combination with a single device.

Referring to FIG. 8, a schematic block diagram illustrates a control system network 400 in which redundancy is selectively implemented using a redundant set of communication media including a primary communication bus 402 and a redundant communication bus 403 with a single further functional element such as a field device 404 connected thereon. The field device 404 includes two sets of interface electronics (not shown) to exploit the redundant media. A loop controller 408 is connected to a primary communication bus 402 and to the redundant communication bus 403 to form a redundant pair of communication loops. The device 404 has a first input connection and a first output connection to the primary communication bus 402 and has a second input connection and a second output connection to the redundant communication bus 403. Accordingly, the device 404 is connected within the redundant pair of communication loops. The single field device 404 optionally detects and communicates a failure status. The loop controller 408 controls the redundancy operation of the redundant communication loops by continuously monitoring the operation of devices in the control system network 400 using two-way digital communications and detects the failure of a functional element, either by receipt of a failure status from the functional element or by detecting a discontinuance of messages from the functional element. The loop controller 408 automatically reconfigures the redundant pair of communication loops by deactivating a bus, such as the primary communication bus 402, upon failure of the primary communication bus 402 and by activating the corresponding alternative redundant communication bus 403. However, in this configuration, the loop controller 408 is unable to recover from a failure of the field device 404. Accordingly, the control system network 400 having a redundant media but a single device or other functional element achieves recovery for a failing communication media but does not recover functionality in the case of the failing device or other functional element.

Figure 9:
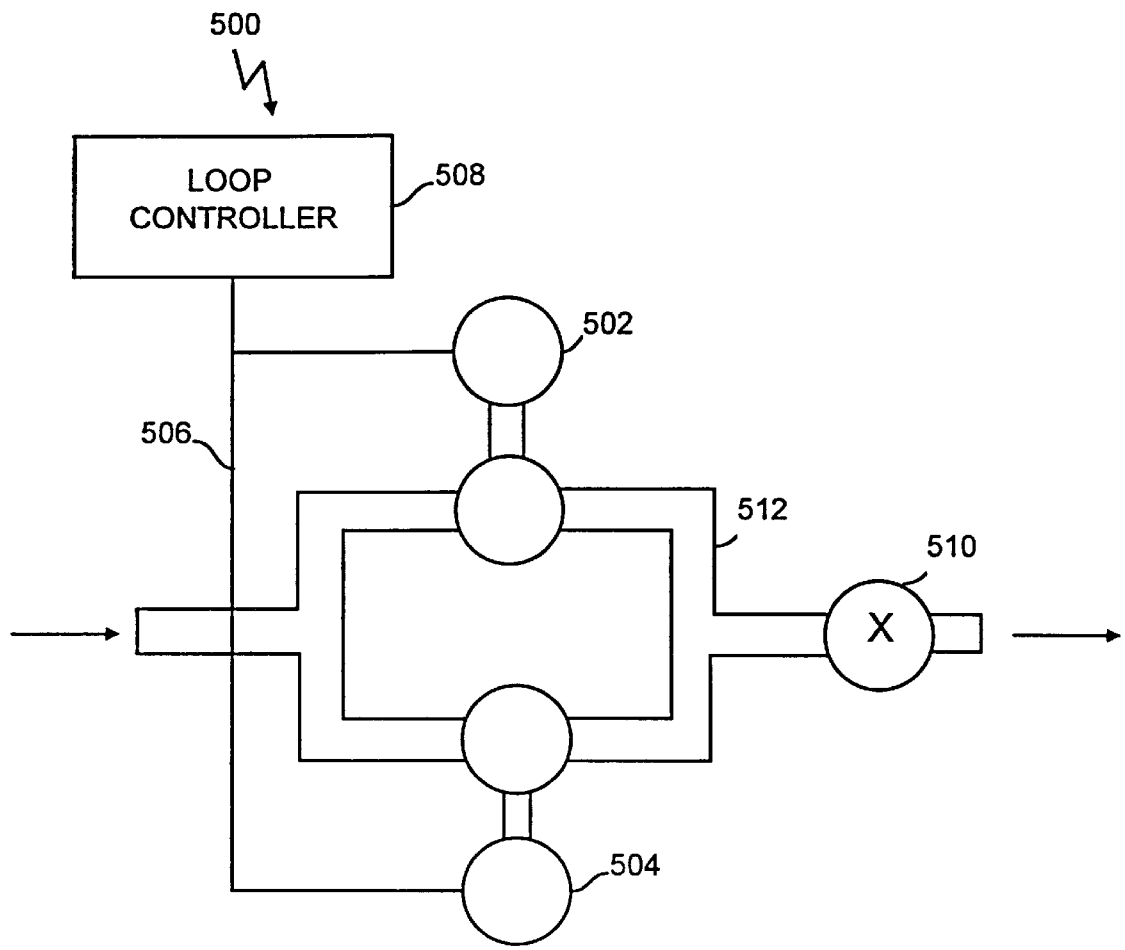
FIG. 9 is a schematic block diagram illustrating a control system network having two functional elements connected into a single two-wire loop.

Referring to FIG. 9, a schematic block diagram illustrates a control system network 500 having two functional elements, a primary process control valve 502 and a redundant process control valve 504 connected in a process flow stream 512. In the control system network 500, the primary process control valve 502 and the redundant process control valve 504 are connected to a single two-wire communication loop 506 which is controlled by a loop controller 508. The loop 506 includes a transmitter 510 located distal to the control valves 504 and 506 from the loop controller 508.

Typically, the primary process control valve 502 is active and the redundant process control valve 504 is on standby or bypass status. The loop 506 utilizes two-way digital communication so that the control valves 504 and 506 and the transmitter 510 all receive messages and transmit messages to the loop controller 508. Accordingly, the loop controller 508 receives information indicative of the precise status of functional elements within the control system network 500.

The loop controller 508, upon receipt of information indicative of a failure or other improper status of a functional element, initiates a response to deactivate the failing functional element and activate a redundant element, if available. The loop controller 508 typically deactivates selected functional elements by placing the functional elements in a failsafe mode of operation.

In some embodiments, the control valves 504 and 506 are set to operate at half-capacity in bypass mode and the response to a failure of a single valve is deactivation of the failing valve and full-capacity activation of the functional valve. Furthermore, the valves 504 and 506 may be connected in series so that one remains open while the other controls flow.

Figure 10:
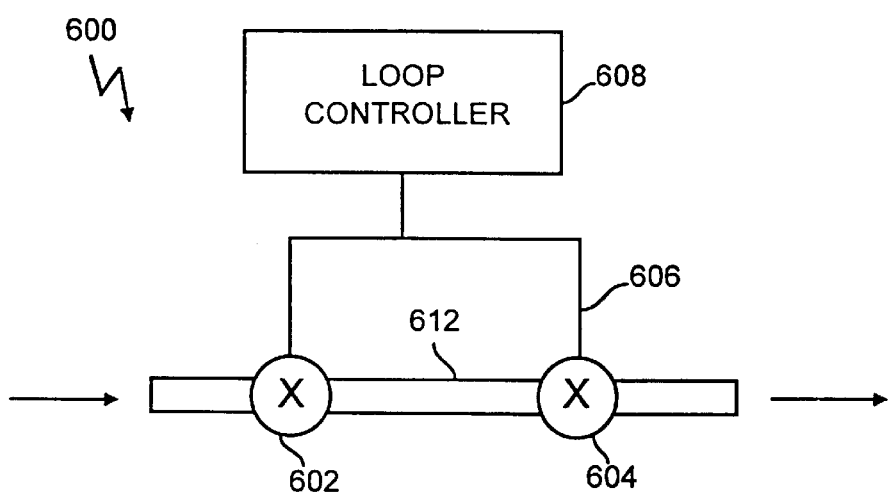
FIG. 10 is a schematic block diagram illustrating a control system network having two transmitters connected into a single two-wire loop.

Referring to FIG. 10, a schematic block diagram illustrates a control system network 600 including two functional elements, a primary transmitter 602 and a redundant transmitter 604 connected in a process flow stream 612. In the control system network 600, the primary transmitter 602 and the redundant transmitter 604 are connected to a single two-wire loop 606 which is controlled by a loop controller 608. The primary transmitter 602 is active and the redundant transmitter 604 is on standby or bypass status. The loop 606 utilizes two-way digital communication so that the transmitters 604 and 606 both receive messages and transmit messages to the loop controller 608. Accordingly, the loop controller 608 receives information indicative of the precise status of functional elements within the control system network 600.

The loop controller 608, upon receipt of information indicative of a failure or other improper status of a transmitter simply ignores transmissions from a nonfunctional transmitter.

Figure 11:
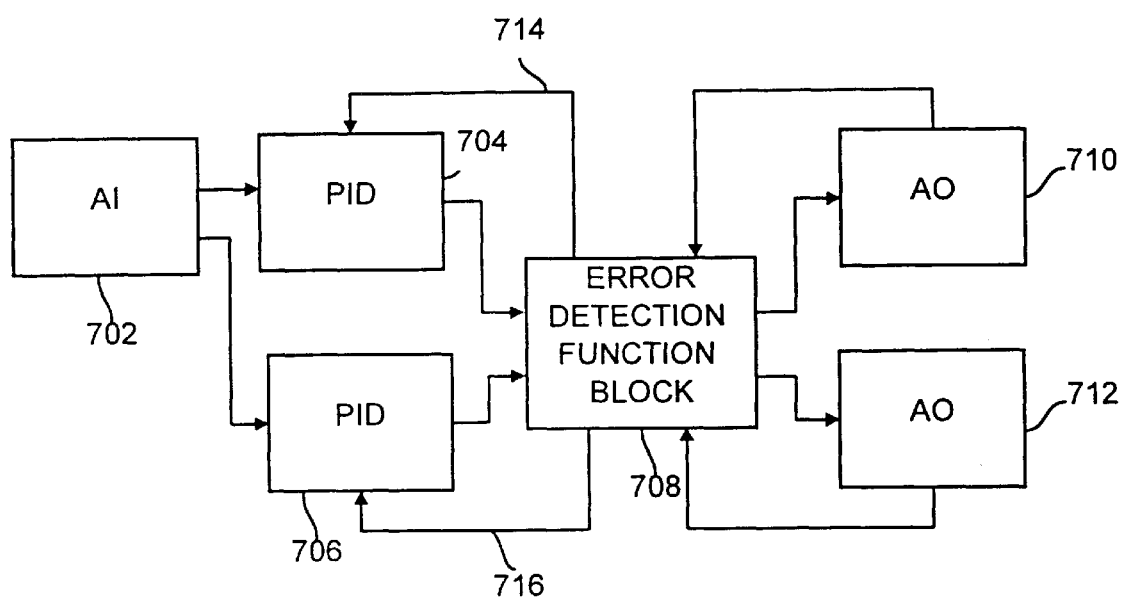
FIG. 11 is a schematic block diagram illustrating a control system network having a redundant function block configuration.

Referring now to FIG. 11, a block diagram of a process control loop 700 having distributed control functions implemented using redundant function blocks, such as those in a Fieldbus communication network, is illustrated. The loop 700, which may implement a simple feedback valve control loop such as that associated with FIG. 4, is illustrated as including a single AI function block 702 connected to a pair of redundant PID function blocks 704 and 706 which, in turn, are connected through an error detection function block 708 to a pair of redundant AO function blocks 710 and 712. During operation, the AI function block 702, one of the PID function blocks 704 or 706 and one of the AO function blocks 710 and 712 operate in conjunction with the error detection function block 708 to implement the simple feedback control loop. As will be evident from FIG. 11, the AI function block 702 directs its output to the PID function blocks 704 and 706, one of which operates to produce a control signal that is delivered through the error detector function block 708 to one of the AO function blocks 710 or 712. The same PID function block 704 or 706 also receives a feedback signal from the one of the AO function blocks 710 or 712 through the error detector function block 708 via one of feedback lines 714 or 716. Thus, for example, during normal operation, the loop 700 may operate with the PID function block 704 and the AO function block 710 connected through the error detection function block 708. The error detection function block 708 analyses the mode of the blocks 704 and 710 (as well as of the blocks 706 and 712) or analyses the signals received from the blocks 704 and 710 to detect if either of these function blocks is malfunctioning. If the error detection function block 708 detects an error status in either of the blocks 704 or 710, the error detection block 708 immediately causes a redundant function block, either the redundant PID function block 706 (if the PID function block 704 is malfunctioning) or the redundant AO function block 712 (if the AO function block 710 is malfunctioning) to operate within the loop 700 to thereby switch the malfunctioning function block out of the loop 700 which, in turn, allows the loop 700 to continue without having to shut the down the loop 700 or to shut down the process in which the loop 700 is connected.

Of course, the error detection function block 708 may switch the operation of the loop 700 in any desired manner, including switching both the redundant function blocks 706 and 712 to operate together when either of the function blocks 704 or 710 malfunctions, switching the loop 700 so that the PID function block 704 and the AO function block 712 operate together when, for example, the AO function block 710 malfunctions or switching the loop 700 so that the redundant PID function block 706 and the AO function block 710 operate together when, for example, the PID function block 704 fails. Likewise, the error detection function block 708 may be coupled between any set of redundant function blocks and a single function block or between any two sets of redundant function blocks within a process control loop in order to provide redundancy therein. Further redundancy may be reached by providing at least one redundant function block for each of the function blocks within a loop, such as by adding a redundant AI function block in the loop 700 of FIG. 11. However, less redundancy may be reached by providing a redundant function block for only one or for only a limited number of the function blocks within a loop. It will also be understood that the error detection function block 708 may be connected in any desired manner and may be located in any device within a process control system as long as the error detection function block 708 is communicatively connected to the other function blocks within a redundant loop via a bus, such as a Fieldbus communication bus. Also, the redundant function blocks, e.g., the blocks 704 and 706 or the blocks 710 and 712 may be located in the same or different devices.

Still further, if desired, the outputs of the PID function blocks 704 and 706 may be coupled directly to the AO function blocks 710 and 712 (as well as to the error detection function block 708) in FIG. 11 while the feedback from the AO function blocks 710 and 712 may be coupled directly to the PID function blocks 704 and 706 (as well as to the error detection function block 708). In this configuration, the error detection function block 708 detects errors within the function blocks 704 and 706 or 710 and 712 and causes a malfunctioning function block to switch out of the loop while simultaneously causing the associated redundant function block to switch into the loop, without actually passing signals between, for example, the PID and the AO function blocks within the loop 700.

Figure 12:
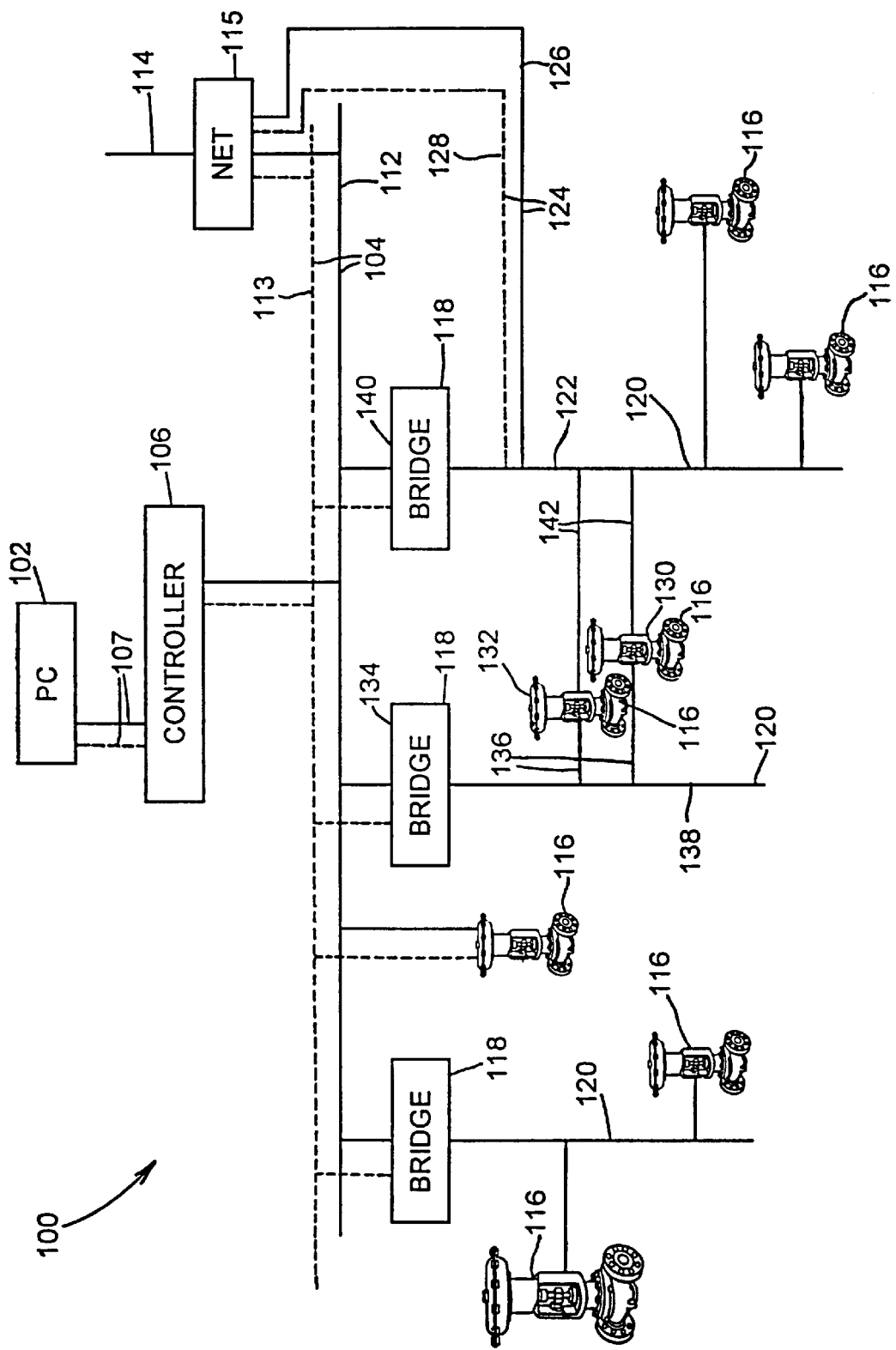
FIG. 12 is a schematic block diagram illustrating a control system network that implements field device redundancy according to the present invention.

Referring now to FIG. 12, a schematic block diagram illustrates a control system network 100 that implements field device redundancy using, for example, any or all of the redundant connections illustrated in FIGS. 6–11 as well as any other redundant connection. The illustrated control system network 100 includes a computer 102, such as a personal computer or a workstation, that is connected to a network bus 104 by a controller 106, such as a digital control system and a pair of redundant communication lines 107. The network bus 104 includes a primary loop 112 and a redundant loop 113, each of which implements two-wire, loop-powered, two-way digital communications according to, for example, the Fieldbus protocol or any other communication protocol associated with a process control system having distributed control functions. The control system network 100 communicates with an external network 114 by a connection of the network bus 104 at a node 115. The control system network 100 includes a plurality of field devices 116 which are connected to the network bus 104 directly or which are connected to the network bus 104 via bridges 118 and local buses 120. In the illustrated control system network 100, one local bus 120 (labeled 122) is connected to the node 115 by an external network redundant bus 124 having a primary loop 126 and a redundant loop 128.

Redundancy may be selectively implemented at the field device level by a primary field device (labeled as 130) and a redundant field device (labeled as 132) which are connected to a first bridge (labeled as 134) by a redundant connection 136 to a local bus 138 and which are connected to a second bridge (labeled as 140) by a redundant connection 142 to the local bus 122. A fully redundant functional element has the same function set or function block capability as a corresponding primary functional element. A limited redundancy functional element has a function set that omits at least one function or feature of a corresponding primary functional element.

The illustrated control system network 100 implements redundancy at many levels in a two-wire, loop-powered, two-way digital-communication environment, in a four-wire communication environment or in any other process control environment that uses distributed control functions. First, the computer 102 is connected to the controller 106 using redundant lines 107. Second the network bus 104 includes a primary loop or bus 112 and a redundant loop or bus 113. Third, the bridges 118 and directly-connected field devices 116 are connected to the network bus 104 with redundant connections. Fourth, the primary field device 130 and the redundant field device 132 are connected to the first bridge 134 by the redundant connection 136 to the local bus 138. Fifth, the primary field device 130 and the redundant field device 132 are connected to the first bridge 134 by a redundant connection 136 to a local bus 138 and are connected to a second bridge 140 by a redundant connection 142 to the local bus 122. Sixth, the local bus 122 is redundantly connected to the external network 114 at the node 115 by the network bus 104 and the external network redundant bus 124. Seventh, the external network redundant bus 124 is a redundant bus. Eighth, redundant function blocks are placed within the devices (for example, the devices 116) connected to the network 100.

In other embodiments of a control system network, redundancy is selectively implemented for the network bus 104 alone or implemented for selected field devices 116, all of the field devices 116 or no field devices 116. Similarly, redundancy of local bus 120 connections to the node 115 and of function blocks are optional.

The control system network 100 implementing field device redundancy is operational for loops implementing two-wire, loop-powered, two-way digital communications as well as four-wire loops or other loops that implement process control functions in a distributed manner, including loops implementing a Fieldbus standard (Fieldbus Foundation, Austin, Tex.), a WORLDFIP standard, a LONWORKS standard, a PROFIBUS standard, any other SP-50 communication standard and the like. The control system network 100 implementing field device redundancy is also operational for loops implementing mixed analog/digital protocols including, for example, the HART standard.

Figure 13:
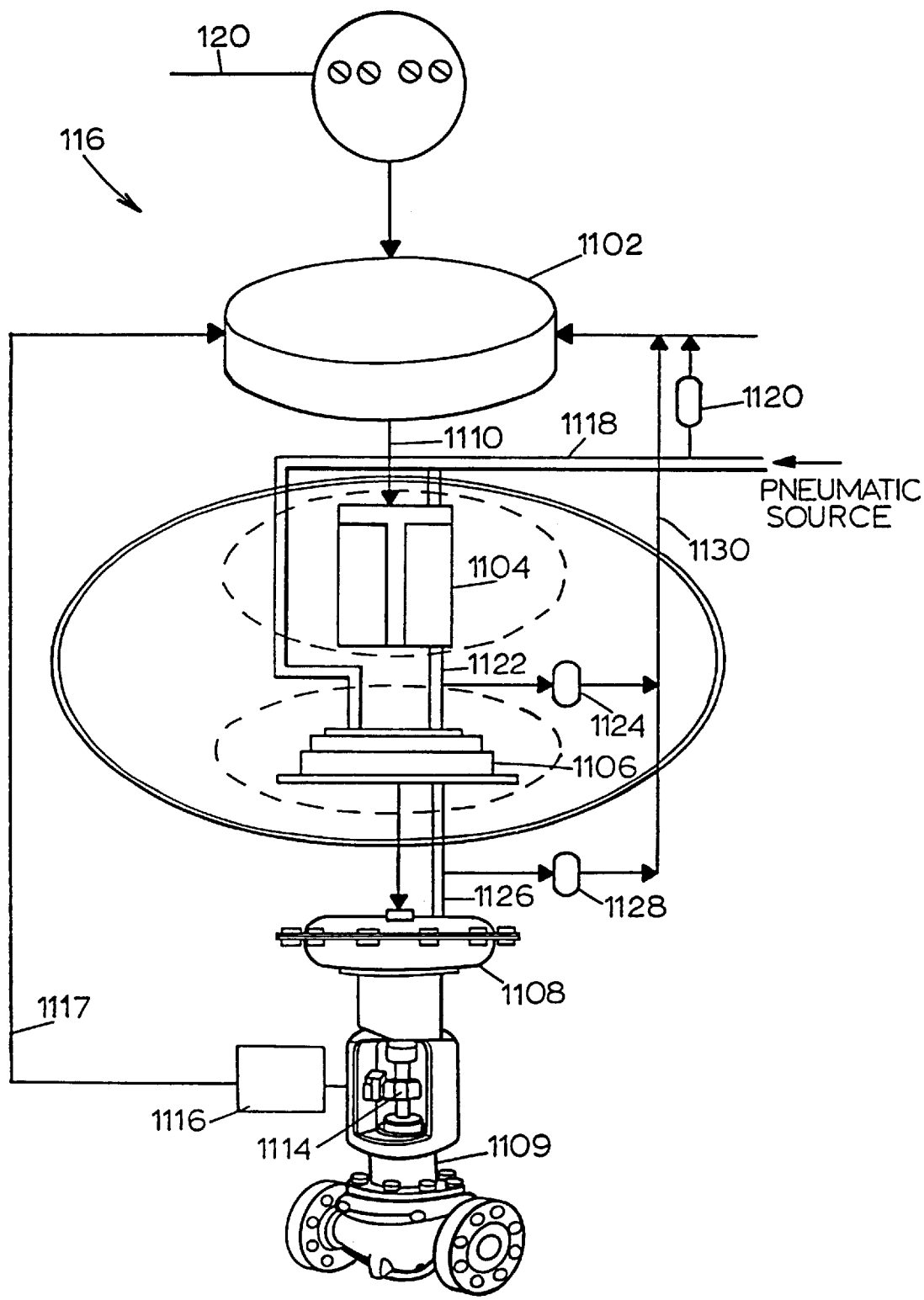
FIG. 13 is a schematic block diagram showing a digital field device having a two-wire, loop-powered, two-way digitally-communicating positioner for use in a process control network of the present invention.

Referring to now to FIG. 13, a schematic block diagram illustrates one of the digital field devices 116 (of FIG. 12) which is a two-wire, loop-powered, two-way digitally communicating positioner/valve combination. The digital field device 116 includes a field device controller 1102, an I/P transducer 1104, a pneumatic relay 1106. an actuator 1108, and a valve 1109, which are interconnected by various pneumatic and electrical lines.

The field device 116 receives operating signals and transmits status information and data in digital form via the two-wire bus 122, preferably according to the Fieldbus standard. and is, therefore, a two-wire positioner. Similarly, the field device 116 receives power, primarily for driving the device controller 1102 and the I/P transducer 1104, via the two-wire continuous loop bus segment 120 and is, therefore, a loop-powered device.

As illustrated in FIG. 13, the I/P transducer 1104 is electrically connected to the device controller 1102 by an I/P transducer control line 1110 and, in the illustrated embodiment, communicates with the device controller 1102 using analog control signals.

The I/P transducer 1104 generates a pneumatic signal that causes actuation of the valve 1109 and is highly useful in electromechanical devices for converting electrical signals to air pressure for a pneumatic positioner. The actuator 1108 controls the position of a valve member 1114 (which may be a valve stem) of the valve 1109 while a position sensor 1116 senses the position of the valve member 1114 and generates a feedback signal that is communicated to the device controller 1102 via a signal line 1117. This position signal may be used by the device controller 1102 to control the operation of the field device 116 so that the I/P transducer 1104 drives the pneumatic pressure in a manner that causes the valve member 1114 to be at a desired position. Position and other feedback information may be stored in a storage unit or a memory of the device controller 1102 and externally accessed via the bus 120 to, for example, detect an error status of the device 116.

As is standard, the field device 116 receives a supply of pressurized air from an external source (not shown) via a pneumatic line 1118 connected to the I/P transducer 1104 and to the pneumatic relay 1106. An input sensor 1120 typically positioned between the external air source and the I/P transducer 1104 measures the input pneumatic supply pressure in the pneumatic line 1118 and delivers this measurement to the device controller 1102. The I/P transducer 1104 is connected to the pneumatic relay 1106 via a pneumatic control line 1122 and an I/P sensor 1124 is positioned between the I/P transducer 1104 and the pneumatic relay 1106 to measure the pneumatic supply pressure in the line 1122. Likewise, the pneumatic relay 1106 is connected to the actuator 1108 via a pneumatic actuation line 1126 and a relay sensor 1128 is positioned between the pneumatic relay 1106 and the actuator 1108 to measure the pneumatic supply pressure in the line 1126. The pneumatic lines 1118, 1122 and 1126 are considered parts of a single pneumatic line interconnecting the transducer 1104 and the valve 1109.

During operation, the device controller 1102 controls actuation of the valve 1109 by controlling the I/P transducer 1104 to set a controlled valve operating pressure in the pneumatic control line 1126. The device controller 1102 sends a control signal to the I/P transducer 1104 via the I/P transducer control line 1110 to control an output pressure of the I/P transducer 1104 and relay 1106 combination to be between about 3–100 psi (0.21–7.06 kscm) which is applied to a control input of the actuator 1108. The actuator 1108 generates an output pressure that is applied to operate the valve 1109.

Thus, as is known, the I/P transducer 1104 converts electrical signals into a pneumatic air pressure signal. One example of a suitable I/P transducer 1104 is described in U.S. Pat. No. 5,439,021, entitled "Electro-Pneumatic Converter," issued to B. J. Burlage et al, on Aug. 8, 1995, which is hereby incorporated by reference herein in its entirety. Likewise, the pneumatic relay 1106, which serves as a pneumatic amplifier, is controlled by the I/P transducer 1104 as directed by the device controller 1102 to increase the air pressure of the pneumatic actuation signal line 1126 a controlled amount. Thus, generally speaking, the pneumatic relay 1106 supplies a controlled output pressure to a load or utilization device, such as an actuator or a piston, in response to a control signal from the device controller 1102. A suitable relay is described in U.S. Pat. No. 4,974,625, entitled "Four Mode Pneumatic Relay," issued to S. B. Paullus et al, on Dec. 4, 1990, which is hereby incorporated by reference herein in its entirety. In the illustrated embodiment, the relay 1106 is a multi-functional four-mode pneumatic relay that is configurable for any combination of direct/snap, direct/proportional, reverse/snap, or reverse/proportional operation. In the proportional mode, the pneumatic relay 1106 develops a pressure output that is proportional to a pressure or force input. In an on/off or snap mode, the pneumatic relay 1106 generates a constant pressure output, usually equal to the pressure of the applied supply, in response to the application of a defined range of force or pressure control inputs. In a direct mode of operation, the output pressure of the pneumatic relay 106 increases with an increasing input signal. In a reverse mode of operation, the relay output pressure decreases with an increasing input signal.

The input sensor 1120, the I/P sensor 1124, and the relay sensor 1128 are pressure transducers that contain a pressure-to-electrical signal converter for converting a pressure signal to an electrical signal and supply feedback signals to the device controller 1102 via a line 1130. The I/P sensor 1124 is diagnostically useful for detecting failure of either the I/P transducer 1104 or the pneumatic relay 1106 and determining, for example, whether a failure is a mechanical failure or an electrical failure. The I/P sensor 1124 is also useful for detecting some system problems including a determination of whether the air pressure input to the digital field device 16 is sufficient. As a result, the I/P sensor 1124 allows the status of the I/P transducer 1104 and the pneumatic relay 1106 to be rapidly diagnosed so that these devices can be replaced quickly, if necessary and so that a process controller can be alerted to switch to the use of a different redundant device, if possible.

In one embodiment, a suitable valve 1109 for use in the digital field device 116 is a valve and actuator assembly using a spring and diaphragm actuator on a sliding stem valve which is used in an analog device described in U.S. Pat. No. 4,976,144, entitled "Diagnostic Apparatus and Method for Fluid Control Valves," issued to W. V. Fitzgerald, on Dec. 11, 1990, which is hereby incorporated by reference herein in its entirety In this exemplary embodiment, a pressure signal of about 3 psi (0.21 kscm) is provided to the actuator 108 in response to an approximate 4 mA signal applied by the device controller 1102 to the I/P transducer 1104, resulting in a corresponding pressure in the pneumatic actuation signal line 1126 that is insufficient to move the valve 1109 from a fully opened position. If the field device controller 1102 changes the control current applied to the I/P transducer 104 to approximately 20 mA, the I/P transducer 1104 generates a pressure in the pneumatic actuation line 1126 of approximately 15 psi (1.06 kscm), which forces the valve 1109 to a fully closed position. Various positions of the valve 1109 between the fully opened position and the fully closed position are attained through the operation of the device controller 1102 controlling the input current applied to the I/P transducer 1104 in the range from 4 mA to 20 mA.

The device controller 1102 performs relatively high-speed digital communications to receive control signals and to transmit position and pressure information to an external processor or workstation in the process control network via the bus 120. The device controller 1102 includes storage or memory for storing the results of multiple diagnostic tests so that pertinent data are available for analysis. Diagnostic operations, such as device diagnostics, are generally in the form of software program codes and are typically encoded, stored and executed in the device controller 1102 of the field device 116.

A device diagnostic evaluation of the valve 1109 may be performed through the operation of the device controller 1102 controlling the input current applied to the I/P transducer 1104 in a range sufficient to test the valve 1109 between fully opened and fully closed positions. During the device diagnostic evaluation, the outputs of the input sensor 1120, the I/P sensor 1124, and the relay sensor 1128 are monitored by the device controller 1102 to sense the pneumatic pressure in the pneumatic lines 1118, 1122 and 1126, respectively, which are used for analysis. The output of the position sensor 1116 is also monitored to detect position or movement of the valve stem 1114 which corresponds to a position of or motion of a valve plug (not shown) within the valve 1109.

Thus, a test operating cycle of the valve 1109 is performed under control of the device controller 1102 by applying a controlled variable current to the I/P transducer 1104, sensing the pressure within the pneumatic lines 1118, 1122 and 1126 and sensing the position of the valve stem 1114 using the position sensor 1116. In this manner, the device controller 1102 simultaneously receives time-varying electrical signals indicating the pressures at the illustrative locations and the position of the valve 1109 and may used these signals to determine any number of device diagnostic parameters in any known or desired manner.

In one embodiment, the I/P transducer 1104 and the pneumatic relay 1106 are tested using a diagnostic test procedure that drives the I/P transducer 1104 full open to measure the full air pressure provided to the valve 1109. While the I/P transducer 1104 is driven open, the I/P sensor 1124 constantly measures pressure in the pneumatic control line 1122. If the pressure begins to decrease, the test indicates that the air supply may be insufficient. A further diagnostic test of air supply sufficiency is performed by pumping the valve 1109 by applying an oscillating signal to the I/P transducer 1104 so that the valve 1109 begins a suction action with respect to the air supply and then measuring maximum flow and maximum pressure values using the I/P sensor 1124.

Figure 14:
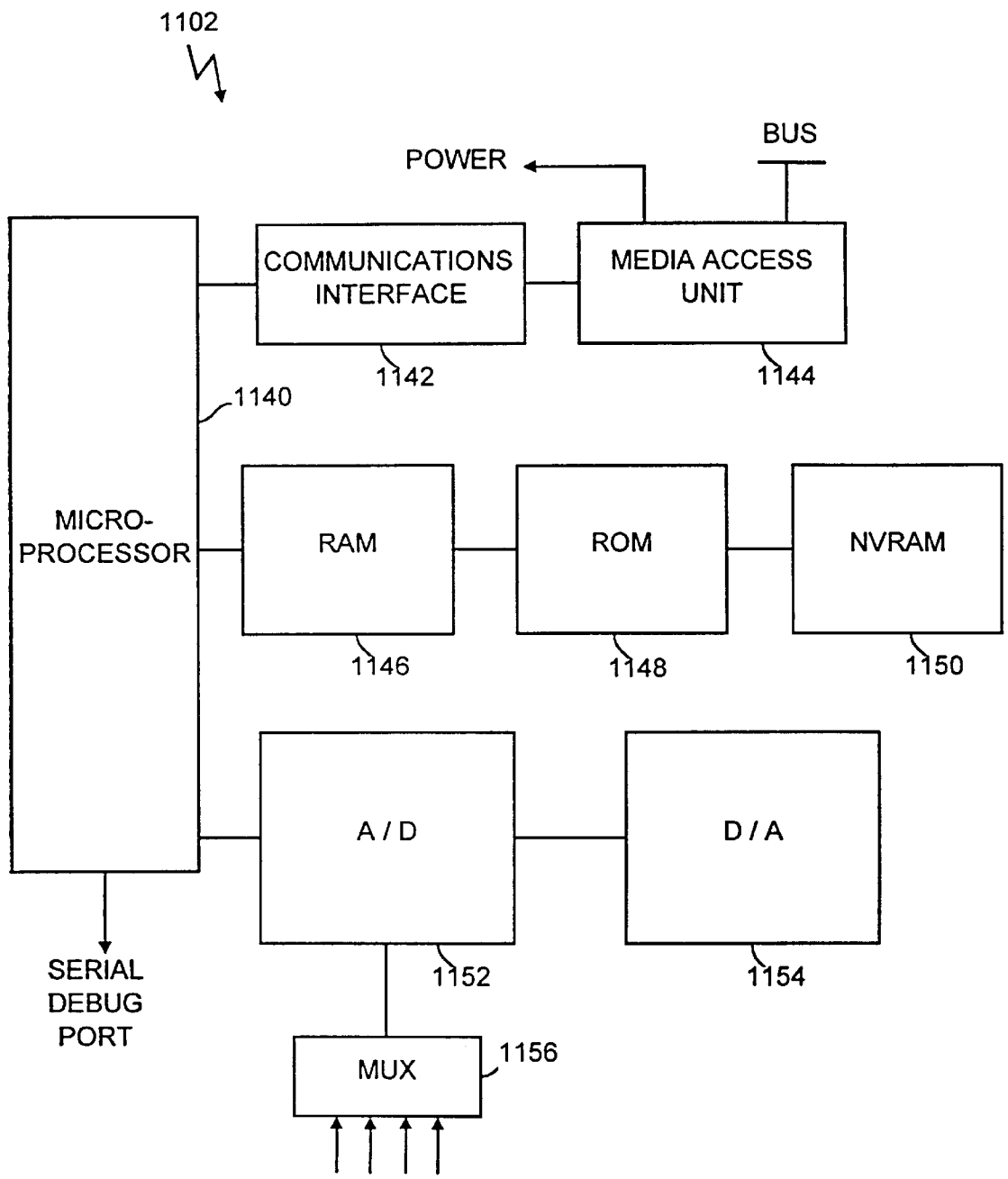
FIG. 14 is a block diagram illustrating a suitable field device controller for use in controlling the digital field device of FIG. 13.

As illustrated in FIG. 14, the device controller 1102 includes a microprocessor 1140, an interface 1142, a bus isolation circuit 1144, a plurality of storage devices such as a random access memory (RAM) 1146, a read-only memory (ROM) 1148 and a nonvolatile random-access memory (NVRAM) 1150, and a plurality of signal processing devices such as an A/D converter 1152, a D/A converter 1154 and a multiplexer 1156. The interface 1142 (which is a bus connector) is a circuit that performs serial to parallel protocol conversion and parallel to serial protocol conversion and is used to add framing information to data packets according to any desired protocol definition, such as the Fieldbus protocol. The bus isolation circuit 1144 is a circuit that is used to convert a two-wire media communication signal on the bus 120 to a digital representation of the communication signal and supplies power received from the bus 120 to other circuits in the device controller 1102 as well as to the I/P transducer 1104. The bus isolation circuit 1144 may also perform wave-shaping and signaling on the bus 120.

The AID converter 1152 is connected to transducers such as the position and pressure transducers of the position sensor 1116 and the pressure sensors 1120, 1124 and 1128 of FIG. 13 as well as to any other desired analog input devices. Although the AID converter 1152 may have a limited number of input channels, the multiplexer 1156 may be used to allow multiple signals to be sampled. If desired, the multiplexer 1156 may include a bank of amplifiers connected between the signal lines 1117 and 1130 (FIG. 13) to amplify the position, pressure and other feedback signals delivered thereto. The D/A converter 1154 performs digital to analog conversion on signals developed by the microprocessor 1140 to be delivered to analog components, such as the I/P transducer 1104.

The illustrated embodiments of a control system network implementing redundancy advantageously provide security to a loop implementing two-wire, loop-powered, two-way digital communications or other communications by retaining the operation of the control system network despite failure of a functional element. This advantage is important in process control systems where the expense of a process control line shutdown is enormous.

Of course, the process control network having redundant elements may be use redundancy in other configurations as desired. Furthermore, while the process control network having redundant elements has been described herein as including transmitters and positioner/valve devices, it is noted that this network can include other types of devices, such as those having moveable elements like dampers, fans, etc., as well as controllers, bridge devices, sensors, etc.

Moreover, although the switching logic of the process control network having redundant elements described herein is preferably implemented in software stored in, for example, a process control device or a controller, it may alternatively or additionally be implemented in hardware, firmware, etc., as desired. If implemented in software, this logic may be stored in any computer readable memory such as on a magnetic disk, a laser disk, or other storage medium, in a RAM or ROM of a computer, etc. Likewise, this software may be delivered to a user or a device via any known or desired delivery method including, for example, over a communication channel such as a telephone line, the internet, etc.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A process control system that performs process control functions within a process in a distributed manner including:
   a communication bus that performs a communication process function in the process;
   a plurality of devices communicatively linked over the communication bus, wherein each of the devices performs a different process function within the process;
   a pair of redundant elements including a primary redundant element and a secondary redundant element that are adapted to perform the same process function within the process; and
   a controller communicatively coupled to the pair of redundant elements via the communication bus to detect a failure of one of the redundant elements using the communication bus and to operationally connect the other of the redundant elements in the process control system upon detection of the failure of the one of the redundant elements.

2. The process control system of claim 1, wherein the communication bus implements a two-wire, two-way, loop-powered digital communication protocol.

3. The process control system of claim 2, wherein the communication protocol is a Fieldbus communication protocol.

4. The process control system of claim 1, wherein the communication bus implements a four-wire communication protocol.

5. The process control system of claim 1, wherein the communication bus implements a two-wire, two-way, loop-powered, mixed digital and analog communication protocol.

6. The process control system of claim 1, wherein the primary redundant element comprises one of the plurality of devices and the secondary redundant element comprises a further device that is coupled to the communication bus.

7. The process control system of claim 6, wherein the primary redundant device and the secondary redundant device are valves that are operatively connected in parallel to each other in the process.

8. The process control system of claim 6, wherein the primary redundant device and the secondary redundant device are transmitters that are operatively connected in serial to each other in the process.

9. A process control system that performs process control functions within a process in a distributed manner including:
   a communication bus that performs a communication process function in the process;
   a plurality of devices communicatively linked over the communication bus, wherein each of the devices performs a different process function within the process;
   a pair of redundant elements including a primary redundant element and a secondary redundant element that are adapted to perform the same process function within the process; and
   a controller coupled to the pair of redundant elements to detect a failure of one of the redundant elements and to operationally connect the other of the redundant elements in the process control system upon detection of the failure of the one of the redundant elements;
   wherein the primary redundant element comprises the communication bus and the secondary redundant element comprises a further communication bus.

10. A process control system that performs process control functions within a process in a distributed manner including:
   a communication bus that performs a communication process function in the process;
   a plurality of devices communicatively linked over the communication bus, wherein each of the devices performs a different process function within the process;
   a pair of redundant elements including a primary redundant element and a secondary redundant element that are adapted to perform the same process function within the process; and
   a controller coupled to the pair of redundant elements to detect a failure of one of the redundant elements and to operationally connect the other of the redundant elements in the process control system upon detection of the failure of the one of the redundant elements;

wherein the primary redundant element comprises a first function block that performs a particular process function and the secondary redundant element comprises a second function block that performs the particular process function.

11. The process control system of claim 10, wherein the first and second function blocks are located in different ones of the plurality of field devices.

12. The process control system of claim 10, wherein the controller includes a further function block communicatively coupled to the first and the second function blocks that detects a malfunction of one of the first and the second function blocks.

13. A process control system that performs process control functions within a process in a distributed manner including:

a communication bus that performs a communication process function in the process;

a plurality of devices communicatively linked over the communication bus, wherein each of the devices performs a different process function within the process;

a pair of redundant elements including a primary redundant element and a secondary redundant element that are adapted to perform the same process function within the process; and a controller coupled to the pair of redundant elements to detect a failure of one of the redundant elements and to operationally connect the other of the redundant elements in the process control system upon detection of the failure of the one of the redundant elements;

wherein the primary redundant element comprises a loop including the communication bus connected to one of the devices and the secondary redundant element comprises a redundant loop including a redundant communication bus connected to a redundant device.

14. A process control system that performs process control functions within a process in a distributed manner including:

a communication bus that performs a communication process function in the process;

a plurality of devices communicatively linked over the communication bus, wherein each of the devices performs a different process function within the process;

a pair of redundant elements including a primary redundant element and a secondary redundant element that are adapted to perform the same process function within the process;

a controller coupled to the pair of redundant elements to detect a failure of one of the redundant elements and to operationally connect the other of the redundant elements in the process control system upon detection of the failure of the one of the redundant elements; and a control logic operating in a functional element associated with the pair of redundant elements, the control logic adapted to detect an operational status of one of the redundant elements and to communicate the operational status to the controller.

15. A process control system that performs process control functions within a process in a distributed manner including:

a communication bus that performs a communication process function in the process;

a plurality of devices communicatively linked over the communication bus, wherein each of the devices performs a different process function within the process;

a pair of redundant elements including a primary redundant element and a secondary redundant element that are adapted to perform the same process function within the process; and a controller coupled to the pair of redundant elements to detect a failure of one of the redundant elements and to operationally connect the other of the redundant elements in the process control system upon detection of the failure of the one of the redundant elements;

wherein the controller includes a detector that detects the termination of communications from one of the pair of redundant elements to detect the failure of the one of the pair of redundant elements.

16. A process control system comprising:

a loop controller including a control logic implementing a two-wire, two-way, loop-powered digital communication protocol;

a redundant pair of two-way communication busses coupled to the loop controller including a primary communication bus and a redundant communication bus; and a plurality of devices coupled to the redundant pair of two-way communication busses;

wherein the controller is adapted to detect a failure associated with one of the redundant pair of busses and to operationally connect the other of the redundant pair of busses in the process control system upon detection of the failure of the one of the redundant pair of busses.

17. The process control system of claim 16, wherein the plurality of devices includes a first redundant device that is connected to the primary communication bus and a second redundant device that is coupled to the redundant communication bus.

18. The process control system of claim 16, wherein one of the plurality of devices is coupled to the primary communication bus and to the redundant communication bus.

19. The process control system of claim 16, wherein the loop controller implements a Fieldbus communication protocol.

20. A process control system comprising:

a loop controller including a control logic implementing a two-wire, two-way, loop-powered digital communication protocol;

a two-way communication loop coupled to the loop controller; and a redundant pair of functional elements including a primary functional element coupled to the communication loop and a redundant functional element coupled to the communication loop;

wherein the loop controller is adapted to detect a failure associated with one of the redundant pair of functional elements via the two-way communication loop and to operationally connect the other of the functional elements in the process control system upon detection of the failure of the one of the functional elements.

21. A method of configuring a process control system that performs process control functions in a process in a distributed manner, the method including the steps of:

providing a communication bus that performs a communication process function in the process control system;

communicatively connecting a plurality of devices over the communication bus such that each of the devices performs a different process function within the process;

using a pair of redundant elements including a primary redundant element and a secondary redundant element within the process to perform the same process function; and using the communication bus to detect a failure of one of the redundant elements; and operationally connecting the other of the redundant elements in the process control system in response to the failure of the one of the redundant elements.

22. The method of claim 21, wherein the primary redundant element comprises the communication bus and the secondary redundant element comprises a further communication bus and further including the step of connecting the communication bus and the further communication bus to the same device.

23. The method of claim 21, wherein the primary redundant element comprises one of the plurality of devices and the secondary redundant element comprises a further device and further including the step of connecting the one of the plurality of devices and the further device to the communication bus.

24. The method of claim 21, wherein the primary redundant element comprises a primary loop including the communication bus connected to one of the devices and the secondary redundant element comprises a redundant loop including a redundant communication bus connected to a redundant device and further including the step of operationally connecting only one of the primary loop or the redundant loop within the process control system at a particular time.

25. A method of configuring a process control system that performs process control functions in a process in a distributed manner, the method including the steps of:

providing a communication bus that performs a communication process function in the process control system;

communicatively connecting a plurality of devices over the communication bus such that each of the devices performs a different process function within the process;

using a pair of redundant elements including a primary redundant element and a secondary redundant element within the process to perform the same process function; and detecting a failure of one of the redundant elements; and operationally connecting the other of the redundant elements in the process control system in response to the failure of the one of the redundant elements;

wherein the primary redundant element comprises a first function block that performs a particular process function and the secondary redundant element comprises a second function block that performs the particular process function and further including the step of alternatively communicatively coupling either the first or the second function block within a process control loop of the process.

26. The method of claim 25, further including the step of locating the first and the second function blocks in different ones of the plurality of field devices.

27. The method of claim 25, further including the step of communicatively connecting a controller function block to the first and second function blocks to detect the failure of one of the first and second function blocks.

* * * * *